United States Patent
Wu et al.

(10) Patent No.: US 12,308,975 B2
(45) Date of Patent: May 20, 2025

(54) HARQ INFORMATION FEEDBACK METHOD AND DEVICE

(71) Applicant: GUANGDONG OPPO MOBILE TELECOMMUNICATIONS CORP., LTD., Guangdong (CN)

(72) Inventors: Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 837 days.

(21) Appl. No.: 17/511,528

(22) Filed: Oct. 26, 2021

(65) Prior Publication Data
US 2022/0052796 A1 Feb. 17, 2022

Related U.S. Application Data

(63) Continuation of application No. PCT/CN2019/085357, filed on Apr. 30, 2019.

(51) Int. Cl.
*H04L 1/1812* (2023.01)
*H04L 1/1867* (2023.01)

(52) U.S. Cl.
CPC ............ *H04L 1/1819* (2013.01); *H04L 1/189* (2013.01); *H04L 1/1896* (2013.01)

(58) Field of Classification Search
CPC . H04W 72/23; H04W 72/21; H04W 72/1268; H04W 4/18; H04W 72/30; H04W 72/232; H04W 72/0446; H04W 16/14; H04W 28/04
See application file for complete search history.

(56) References Cited

U.S. PATENT DOCUMENTS

2019/0029052 A1 1/2019 Yang et al.

FOREIGN PATENT DOCUMENTS

CN 107666373 2/2018

OTHER PUBLICATIONS

EPO, Extended European Search Report for EP Appl. No. 19927127.1, Mar. 24, 2022.
Nokia et al., "HARQ scheduling and feedback for NR-U", 3GPP TSG RAN WG1 Ad-Hoc Meeting #96bis, Apr. 8, 2019, R1-1904183.
(Continued)

*Primary Examiner* — Khalid W Shaheed
(74) *Attorney, Agent, or Firm* — Hodgson Russ LLP

(57) ABSTRACT

Provided are an HARQ information feedback method and device, capable of performing effective processing on HARQ information corresponding to each channel group, thereby implementing transmission of HARQ information on an unlicensed band. The method comprises: a terminal device determines HARQ information corresponding to a first channel group; after receiving a second channel satisfying a preset condition, and/or receiving first instruction information for instructing to reset the HARQ information, the terminal device resets the HARQ information corresponding to the first channel group, wherein the preset condition comprises that the HARQ process number of the second channel is the same as the HARQ process number of a first channel in the first channel group, and/or the group number of the channel group to which the second channel belongs is the same as the group number of the first channel group.

18 Claims, 9 Drawing Sheets

(56) References Cited

OTHER PUBLICATIONS

Huawei, "Feature lead summary of HARQ enhancements for NR-U", 3GPP TSG RAN WG1 Meeting #96bis, Apr. 8, 2019, R1-1905649.
LG Electronics, "Harq procedure for NR-U," 3GPP TSG RAN WG1 #96bis, R1-1904624, Apr. 2019.
Intel Corporation, "Enhancements to HARQ for NR-unlicensed," 3GPP TSG RAN WG1 Meeting #96, R1-1902473, Feb. 2019.
Intel Corporation, "Enhancements to HARQ for NR-unlicensed," 3GPP TSG RAN WG1 Meeting #96bis, R1-1904287, Apr. 2019.
WIPO, International Search Report and Written Opinion for PCT/CN2019/085357, Jan. 6, 2020.
EPO, Communication for EP Application No. 19927127.1, Jun. 9, 2023.

HARQ INFORMATION FEEDBACK METHOD AND DEVICE

CROSS-REFERENCE TO RELATED APPLICATION

This application is a continuation of International Application No. PCT/CN2019/085357, filed Apr. 30, 2019, the entire disclosure of which is incorporated herein by reference.

TECHNICAL FIELD

Embodiments of the application relate to the field of communications, and more specifically, to a method and a device for HARQ information feedback.

BACKGROUND

The 5G system, also referred to as New Radio (NR) system, supports data transmission on unlicensed spectrum. When a communication device performs NR-based access to unlicensed spectrum (NR-U) communication, it needs to follow the principle of listen before talk (LBT). In other words, before sending a signal on the unlicensed spectrum, channel listening needs to be performed first, and the signal can be sent only when the result of listening indicates that the channel is idle. Otherwise, the signal cannot be sent when the result of listening indicates that the channel is busy.

After the terminal device receives the downlink channel sent by the network device on the unlicensed carrier, it needs to send corresponding hybrid automatic repeat request (HARQ) information to the network device on the unlicensed carrier. Herein, the network device can group the downlink channels scheduled by it, and the terminal device performs corresponding HARQ information feedback according to different channel groups. Due to the uncertainty of channel usage on the unlicensed spectrum, HARQ information corresponding to certain channel groups may need to be transmitted multiple times before being received by the network device. During this procedure, how the terminal device processes the HARQ information corresponding to each channel group has become an urgent problem to be solved.

SUMMARY

Embodiment of the disclosure provide a method and a device for HARQ information feedback, which enable effective processing on HARQ information corresponding to respective channel group, thereby achieving transmission of HARQ information on the unlicensed spectrum.

According to a first aspect, there is provided a method for feeding back HARQ information, including: determining, by a terminal device, HARQ information corresponding to a first channel group; and resetting, by the terminal device, the HARQ information corresponding to the first channel group when receiving a second channel meeting a preset condition, and/or when receiving first indication information used for indicating resetting of HARQ information.

Herein, the preset condition includes: an HARQ process number of the second channel is the same as an HARQ process number of a first channel in the first channel group, and/or a group number of a channel group to which the second channel belongs is the same as a group number of the first channel group.

According to a second aspect, there is provided a method for feeding back HARQ information, including: receiving, by a terminal device, second indication information sent by a network device, where the second indication information indicates a parameter for feeding back HARQ information.

Optionally, the method further includes: receiving, by the terminal device, third indication information, where the third indication information is used for indicating a feedback manner of HARQ information, and the feedback manner of HARQ information includes a first feedback manner and a second feedback manner.

According to a second aspect, there is provided a method for feeding back HARQ information, including: sending, by a network device, second indication information to a terminal device, where the second indication information indicates a parameter for feeding back HARQ information. The parameter includes, for example, a feedback manner of HARQ information, and the feedback manner of HARQ information includes a first feedback manner and a second feedback manner.

According to any implementation manner of the second aspect and the third aspect, in the first feedback manner, HARQ information corresponding to the channel group with the same group number sent by the terminal device each time has the same codebook size; and in the second feedback manner, HARQ information corresponding to the channel group with the same group number sent by the terminal device each time has variable codebook size, for example, the codebook size varies depending on flip indication information received by the terminal device.

According to a fourth aspect, there is provided a terminal device, which can perform the method according to the foregoing first aspect or any optional embodiment thereof. Specifically, the terminal device may include a functional module for performing the method according to the foregoing first aspect or any optional embodiment thereof.

According to a fifth aspect, there is provided a terminal device, which can perform the method according to the foregoing second aspect or any optional embodiment thereof. Specifically, the terminal device may include a functional module for performing the method according to the foregoing second aspect or any optional embodiment thereof.

According to a sixth aspect, there is provided a network device, which can perform the method according to the foregoing third aspect or any optional embodiment thereof. Specifically, the network device may include a functional module for performing the method according to the foregoing third aspect or any optional embodiment thereof.

According to a seventh aspect, there is provided a terminal device, including: a processor and a memory. The memory is configured to store a computer program, and the processor is configured to call and run the computer program stored in the memory, thereby performing the method according to the foregoing first aspect or any optional embodiment thereof, or the method according to the foregoing second aspect or any optional embodiment thereof.

According to an eighth aspect, there is provided a network device, including: a processor and a memory. The memory is configured to store a computer program, and the processor is configured to call and run the computer program stored in the memory, thereby performing the method according to the foregoing third aspect or any optional embodiment thereof.

According to a ninth aspect, there is provided a communication device, including a processor. The processor is configured to call and run a computer program from a memory, thereby causing an apparatus provided with the communication device to perform the method according to the foregoing first aspect or any optional embodiment thereof, or the method according to the foregoing second aspect or any optional embodiment thereof.

According to a tenth aspect, there is provided a communication device, including a processor. The processor is configured to call and run a computer program from a memory, thereby causing an apparatus provided with the communication device to perform the method according to the foregoing third aspect or any optional embodiment thereof.

According to an eleventh aspect, there is provided a computer-readable storage medium, used for storing a computer program, wherein the computer program causes a computer to perform the method according to the foregoing first aspect or any optional embodiment thereof, or the method according to the foregoing second aspect or any optional embodiment thereof.

According to a twelfth aspect, there is provided a computer-readable storage medium, used for storing a computer program, wherein the computer program causes a computer to perform the method according to the foregoing third aspect or any optional embodiment thereof.

According to a thirteenth aspect, there is provided a computer program product, including computer program instructions, wherein the computer program instructions cause a computer to perform the method according to the foregoing first aspect or any optional embodiment thereof, or the method according to the foregoing second aspect or any optional embodiment thereof.

According to a fourteenth aspect, there is provided a computer program product, including computer program instructions, wherein the computer program instructions cause a computer to perform the method according to the foregoing third aspect or any optional embodiment thereof.

According to a fifteenth aspect, there is provided a computer program which, when running on a computer, causes the computer to perform the method according to the foregoing first aspect or any optional embodiment thereof, or the method according to the foregoing second aspect or any optional embodiment thereof.

According to a sixteenth aspect, there is provided a computer program which, when running on a computer, causes the computer to perform the method according to the foregoing third aspect or any optional embodiment thereof.

According to a seventeenth aspect, there is provided a communication system, including a terminal device and a network device;

the network device is configured to send second indication information to the terminal device, where the second indication information indicates a parameter used for feeding back HARQ information; and the terminal device is configured to receive the second indication information sent by the network device, and determine the parameter for feeding back HARQ information according to the second indication information.

Based on the above technical solution, in the process of feeding back HARQ information corresponding to a certain channel group, when the terminal device receives the second channel that meets the preset condition or receives the first indication information indicating resetting of the HARQ information, the terminal device resets the HARQ information corresponding to the channel group, thereby achieving effective transmission of HARQ information on the unlicensed frequency band.

DETAILED DESCRIPTION

The technical solutions in the embodiments of the application will be described below in conjunction with the drawings.

The technical solutions of the embodiments of this application can be applied to various communication systems, for example, Global System of Mobile communication (GSM) system, Code Division Multiple Access (CDMA) system, Wideband Code Division Multiple Access (WCDMA) system, Long Term Evolution (LTE) system, LTE Frequency Division Duplex (FDD) system, LTE Time Division Duplex (TDD) system, Advanced long term evolution (LTE-A) system, New Radio (NR) system, NR evolution system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), future-evolved 5G system or other communication systems.

Generally speaking, traditional communication systems support a limited number of connections and are easy for implementation. However, with the development of communication technology, mobile communication systems will not only support traditional communication, but also support, for example, Device to Device (D2D) communication, Machine to Machine (M2M) communication, machine type communication (MTC), and vehicle to vehicle (V2V) communication, and the like. The embodiments of this application can also be applied to these communication systems.

Optionally, the communication system in some embodiments of the application may also be applied to a carrier aggregation (CA) scenario, a dual connectivity (DC) scenario, a standalone (SA) network deployment scenario, and the like.

Figure 1:
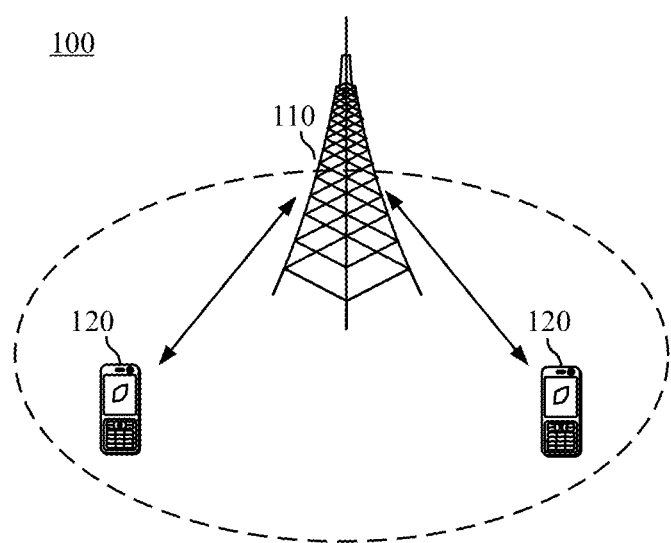
FIG. 1 is a schematic diagram of an exemplary wireless communication system implementing some embodiments of the application.

FIG. 1 is a schematic diagram of an exemplary wireless communication system implementing some embodiments of the application. The wireless communication system 100 may include a network device 110. The network device 110 may provide communication coverage for a specific geographic area, and may communicate with terminal devices located in the coverage area.

Optionally, the network device 110 may be a base transceiver station (BTS) in GSM system or CDMA system, a NodeB (NB) in WCDMA system, or an evolutional Node B (eNB or eNodeB) in LTE system, or a wireless controller in the cloud radio access network (CRAN). Optionally, the network device may be a relay station, an access point, a vehicle-mounted device, a wearable device, a future-network side device or a network device in future evolution of the public land mobile network (PLMN), or the like.

The wireless communication system 100 also includes at least one terminal device 120 located within the coverage area of the network device 110.

The terminal device 120 may be mobile or fixed.

Optionally, the terminal device 120 may refer to a user equipment, an access terminal, a user unit, a user station, a mobile station, a remote station, a remote terminal, a mobile device, a user terminal, a terminal, a wireless communication device, a user agent, or a user device. The terminal device can also be a cellular phone, a cordless phone, a session initiation protocol (SIP) phone, a wireless local loop (WLL) station, a personal digital assistant (PDA), handheld devices or computing devices with wireless communication function, or other processing devices connected to wireless modems, in-vehicle devices, wearable devices, terminal devices in the future 5G network or in future evolution of the public land mobile network (PLMN) or the like, which is not limited in the embodiments of the application. In some embodiments, optionally, device to device (D2D) communication may also be performed between the terminal devices 120.

The network device 110 may provide services for a cell, and the terminal device 120 communicates with the network device 110 through transmission resources used by the cell, such as frequency domain resources, or spectrum resources. The cell may be a cell corresponding to the network device 110. The cell may belong to a macro base station or a base station corresponding to a small cell. The small cell here may include a metro cell, a micro cell, a pico cell, a femto cell or the like. These small cells have the characteristics of small coverage and low transmit power, and are suitable for providing high-rate data transmission services.

FIG. 1 exemplarily shows one network device and two terminal devices, but the application is not limited thereto. The wireless communication system 100 may include a plurality of network devices, and the coverage area of each network device may include other numbers of terminal devices. In addition, the wireless communication system 100 may also include other network entities such as a network controller and a mobility management entity.

Unlicensed frequency spectrum (or unlicensed frequency band) is the spectrum that can be used for radio communication divided by countries and regions. This spectrum is usually considered as shared spectrum, that is, communication equipment in different communication systems can use the spectrum as long as meeting the requirements regulated by the country or region on the spectrum, without necessity to apply for a proprietary spectrum authorization from the government.

In order to allow various communication systems that use unlicensed spectrum for wireless communication to coexist friendly on the spectrum, some countries or regions have stipulated the legal requirements that must be met when using unlicensed spectrum. For example, the communication device follows the "listen before talk (LBT)" principle, that is, the communication device needs to perform channel detection before transmitting signals on channels of unlicensed spectrum. Only when the channel detection result is that the channel is idle, the communication device can perform signal transmission; if the channel detection result of the communication device on the channel of the unlicensed spectrum is that the channel is busy, the communication device cannot perform signal transmission.

In some embodiments, signal transmission on unlicensed spectrum involves the following concepts.

Maximum channel occupancy time (MCOT) refers to the maximum length of time allowed to use unlicensed spectrum channels for signal transmission after successful LBT. In other words, the MCOT is the time occupied by signal transmission. There are different MCOTs under different channel access priorities. Generally, the maximum value of MCOT is 10 ms.

Channel occupancy time (COT) refers to the length of time for signal transmission using channels of unlicensed spectrum after successful LBT. The channels occupied by signals within this time length may be discontinuous. Generally, one COT cannot exceed 20 ms at most, and the time length occupied by signal transmission within the COT does not exceed MCOT.

gNB-initiated COT, also known as COT initiated by gNB, refers to a channel occupancy time obtained by the base station after successful LBT. The channel occupancy time of the base station can not only be used for downlink transmission, but also can be used by UE for uplink transmission under certain conditions.

UE-initiated COT, also known as COT initiated by UE, refers to a channel occupancy time obtained after the UE successfully performs LBT.

Downlink transmission opportunity (DL burst) refers to a group of downlink transmissions performed by a base station including, for example, one or more downlink transmissions. Such group of downlink transmissions is continuous transmission, that is, there is no gap between multiple downlink transmissions, or there is a gap in the group of downlink transmissions but the gap is less than or equal to a preset value such as 16 μs. If the gap between two downlink transmissions performed by the base station is greater than 16 μs, then the two downlink transmissions are considered as belong to two DL bursts.

Uplink transmission opportunity (UL burst) refers to a group of uplink transmissions performed by a UE including, for example, one or more uplink transmissions. Such group of uplink transmissions is continuous transmission, that is, there is no gap between multiple uplink transmissions, or there is a gap in the group of uplink transmissions but the gap is less than or equal to a preset value such as 16 μs. If the gap between two uplink transmissions performed by the UE is greater than 16 μs, then the two uplink transmissions are considered as belong to two UL bursts.

In the NR system on the unlicensed frequency band, it can support SA network deployment, that is, it does not rely on any carrier on the licensed frequency band to provide auxiliary services. In this scenario, after receiving PDSCH on the unlicensed carrier, the terminal device needs to send HARQ-ACK feedback corresponding to the PDSCH on the unlicensed carrier.

The NR system supports dynamic determination of HARQ feedback timing. The network device schedules the terminal device to receive physical downlink shared channel (PDSCH) through downlink control information (DCI). In some embodiments, the DCI includes indication information of physical uplink control channel (PUCCH) resources used for transmitting HARQ information corresponding to the PDSCH. The indication information may include PUCCH resource indicator and HARQ timing indicator.

The PUCCH resource indicator is used for determining PUCCH resources.

The HARQ timing indicator (also known as PDSCH-to-HARQ feedback timing indicator) is used for dynamically determining the time domain position of the PUCCH resource. In some embodiments, the HARQ timing indicator information is used for determining the value in a pre-configured HARQ timing set. For example, when the HARQ timing indicator information is 000, it may indicate k0 in the HARQ timing set; and when the HARQ timing indicator information is 001, it may indicate k1 in the HARQ timing set.

Herein, in the unlicensed frequency band, in addition to determining the PUCCH resource for transmitting the HARQ corresponding to the PDSCH, the HARQ timing indicator information may also be used for indicating a state where the HARQ information corresponding to the PDSCH is not fed back temporarily. For example, the pre-configured HARQ timing set further includes a value kL indicating an invalid resource indicator. When the HARQ timing indicator information is 111, it may indicate kL in the HARQ timing set. At this time, if the HARQ timing indicator information received by the terminal device is 111, it means that the corresponding PUCCH resource cannot be determined temporarily.

In addition, if it is a dynamic codebook feedback, the DCI may also include a downlink assignment index (DAI). The DAI includes DAI count information and/or DAI total information. The DAI count information is used for indicating how many PDSCHs in the current HARQ feedback window are scheduled before the current scheduled PDSCH, and the DAI total information is used for indicating how many PDSCHs are scheduled in the current HARQ feedback window.

The terminal device can determine the PUCCH resource used for feeding back HARQ information and the position of the HARQ information in the codebook transmitted on the PUCCH resource according to the above information.

It should be understood that the HARQ information in the embodiments of the application may also be referred to as HARQ-ACK information, that is, ACK or NACK information obtained based on the decoding result after the PDSCH is decoded, or occupancy information of the terminal device during feedback.

In order to flexibly feed back the HARQ information corresponding to the PDSCH on the unlicensed frequency band, the network device can group its scheduled PDSCHs, and indicate the PDSCH grouping information to the terminal device through indication signaling, so that the terminal device, after receiving the PDSCH, can perform feedback of corresponding HARQ information according to different channel groups. If the HARQ information corresponding to a certain group of PDSCH performed by the terminal device fails to be transmitted due to LBT failure during one transmission, or the network device fails to detect the HARQ information expected to be transmitted by the terminal device on a certain PUCCH resource, the network device can trigger the terminal device to retransmit the HARQ information through DCI.

In some embodiments, when the terminal device retransmits the HARQ information corresponding to a certain group of PDSCH, it can maintain the same codebook size as the initial transmission, or it can add new HARQ information during the retransmission. Detailed description will be given below in conjunction with FIG. 2.

Figure 2:
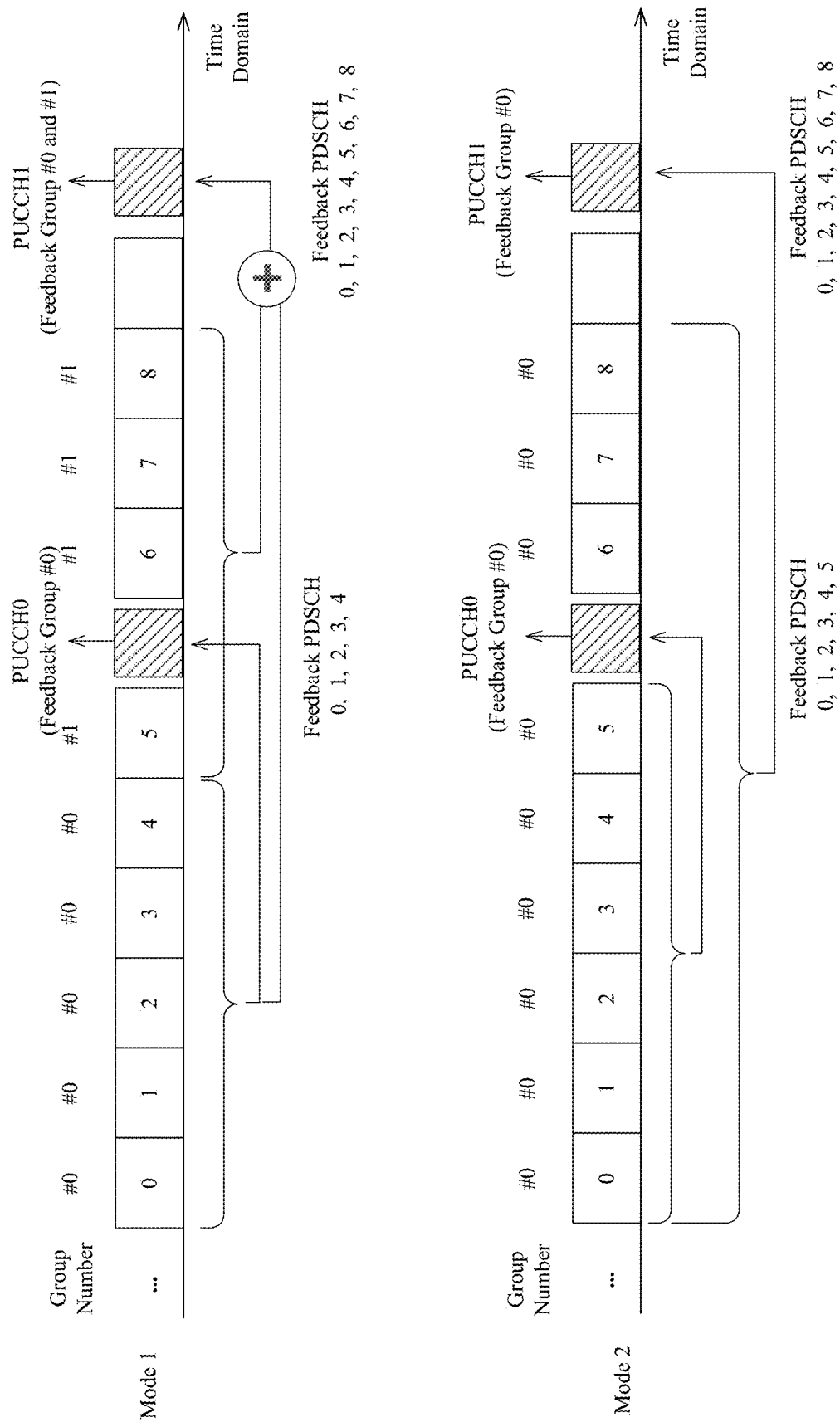
FIG. 2 illustrates two manners for feeding back HARQ information.

In some embodiments of the application, the terminal device may send HARQ information to the network device in the two HARQ information feedback modes shown in FIG. 2.

It should be understood that the HARQ information described in the embodiments of the application includes HARQ-ACK information or HARQ-NACK information.

As shown in FIG. 2, the network device groups its scheduled downlink channels. Each channel group (or called a data group or a HARQ feedback group) has a group number, such as group number #0 (abbreviated as group #0), group number #1 (abbreviated as group #1), group number #2 (abbreviated as group #2), and the like. The terminal device determines PUCCH resource used for sending HARQ information corresponding to each channel group according to the indication signaling sent by the network device.

In mode 1, the terminal device sends HARQ information corresponding to channel group #0 to the network device on PUCCH resource 0 based on the indication of the network device. The channel group #0 includes PDSCH 0, PDSCH 1, PDSCH 2, PDSCH 3, and PDSCH 4. Based on the indication of the network device, the terminal device sends HARQ information corresponding to channel group #0 and channel group #1 to the network device on PUCCH resource 1, where channel group #0 includes PDSCH 0, PDSCH 1, PDSCH 2, PDSCH 3, and PDSCH 4, and channel group #1 includes PDSCH 5, PDSCH 6, PDSCH 7, and PDSCH 8.

It can be seen that when the HARQ information corresponding to channel group #0 is initially transmitted and retransmitted on PUCCH resource 0 (abbreviated as PUCCH 0) and PUCCH resource 1 (abbreviated as PUCCH 1), the size of HARQ codebook remains unchanged. In other words, if the HARQ information corresponding to a PDSCH included in the channel group #0 has been indicated to be transmitted on a certain uplink PUCCH resource, no new PDSCH will be added in the channel group #0. When the HARQ information corresponding to the channel group #0 is transmitted on PUCCH resource 0 and PUCCH resource 1, channel group #0 includes PDSCH 0, PDSCH 1, PDSCH 2, PDSCH 3, and PDSCH 4.

In mode 2, the terminal device sends HARQ information corresponding to channel group #0 to the network device on PUCCH resource 0 based on the indication of the network device, where channel group #0 includes PDSCH 0, PDSCH 1, PDSCH 2, PDSCH 3. PDSCH 4 and PDSCH 5. Based on the indication of the network device, the terminal device sends the HARQ information corresponding to channel group #0 to the network device on PUCCH resource 1, where channel group #0 includes PDSCH 0, PDSCH 1, PDSCH 2, PDSCH 3, PDSCH 4, PDSCH 5, PDSCH 6, PDSCH 7, and PDSCH 8.

It can be seen that when the HARQ information corresponding to channel group #0 is retransmitted and initially transmitted on PUCCH resource 0 and PUCCH resource 1, the size of HARQ codebook has changed. PUCCH resource 0 transmits PDSCH 0 to PDSCH 5 in channel group #0, and PUCCH resource #1 transmits PDSCH 0 to PDSCH 8 in channel group #1. The size of HARQ codebook fed back twice has changed.

Hereinafter, the HARQ feedback based on the mode 1 is referred to as the HARQ feedback mode with a constant codebook size, and the HARQ feedback based on the mode 2 is referred to as the HARQ feedback mode with a variable codebook size. It should be understood that in mode 2, the size of HARQ codebook fed back twice may also be unchanged in certain situations.

After the terminal device performs a transmission of HARQ information, since it is not sure whether the network device has received the HARQ information, the terminal device buffers the HARQ information until the terminal device considers that the network device has successfully received the HARQ information, then the HARQ information in the buffer can be cleared. Hereinafter, clearing HARQ information is also referred to as resetting HARQ information.

Some embodiments of the application provide a method for feeding back HARQ information, through which the terminal device can reset the HARQ information corresponding to a certain channel group at an appropriate time, thereby realizing the transmission of HARQ information on the unlicensed spectrum.

Figure 3:
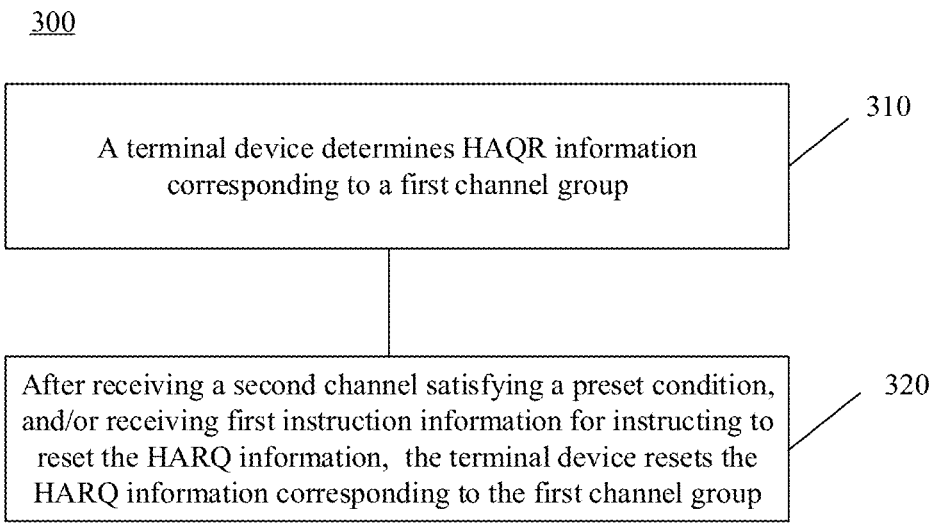
FIG. 3 is a schematic flowchart of the method for feeding back HARQ information according to some embodiments of the application.

FIG. 3 illustrates a method 300 for feeding back HARQ information according to some embodiments of the application. The method may be executed by a terminal device, and the terminal device may be, for example, the terminal device 120 in FIG. 1 described above. This method can be applied to unlicensed spectrum or licensed spectrum. As shown in FIG. 3, the method includes some or all of the following steps.

In 310, the terminal device determines HARQ information corresponding to a first channel group.

In 320, the terminal device resets the HARQ information corresponding to the first channel group when receiving a second channel that meets a preset condition and/or when receiving first indication information used for indicating to reset the HARQ information.

The preset condition includes: an HARQ process number of the second channel is the same as an HARQ process number of a first channel in the first channel group, and/or a group number of a channel group to which the second channel belongs is the same as a group number of the first channel group.

In some embodiments, the terminal device feedbacks HARQ information of a corresponding channel group based on grouping of downlink channels by the network device. After determining the HARQ information corresponding to the first channel group, the terminal device buffers the HARQ information corresponding to the first channel group, and clears the HARQ information corresponding to the first channel group when receiving the second channel that meets the preset condition. In other words, the terminal device resets the HARQ information corresponding to the first channel group when receiving the second channel that meets the preset condition; or clears the HARQ information corresponding to the first channel group when receiving the first indication information used for indicating resetting of HARQ information, that is, the HARQ information corresponding to the first channel group is reset when the terminal device receives the first indication information. Therefore, the HARQ information corresponding to a certain channel group can be reset at an appropriate time, thereby saving bit overhead and realizing effective transmission of HARQ information on the unlicensed spectrum.

This method can be applied to the aforementioned two HARQ feedback modes, that is, the HARQ feedback mode in which the codebook size of HARQ information corresponding to the channel group remains unchanged during each transmission, and the HARQ feedback mode in which the codebook size of HARQ information corresponding to the channel group is variable for each transmission.

The terminal device receives the first channel group sent by the network device, and determines the HARQ information corresponding to the first channel group. Then the HARQ information corresponding to the first channel group is buffered until the terminal device receives the second channel that meets the preset condition or receives the first indication information for indicating resetting of the HARQ information.

Optionally, before the terminal device receives the second channel, and/or before the terminal device receives the first indication information, the terminal device transmits the HARQ information corresponding to the first channel group at least once.

For example, before receiving the second channel or the first indication information, the terminal device initially transmits the HARQ information corresponding to the first channel group, or performs the initial transmission and at least one retransmission.

If the terminal device transmits the HARQ information corresponding to the first channel group multiple times before receiving the second channel or the first indication information, the codebook size of the HARQ information corresponding to the first channel group transmitted multiple times may be the same, for example, as in the mode 1 shown in FIG. 2; or the codebook size of the HARQ information corresponding to the first channel group transmitted multiple times may be different, for example, as in the mode 2 shown in FIG. 2.

Optionally, the terminal device receiving the second channel that meets the preset condition includes: the terminal device receives a downlink channel that meets the preset condition for scheduling the second channel, and/or the terminal device receives data carried in the second channel that meets the preset condition.

For example, when the PDSCH meets the preset condition, the terminal device resets the HARQ information corresponding to the first channel group.

For another example, when the PDCCH used for scheduling the PDSCH meets the preset condition, the terminal device resets the HARQ information corresponding to the first channel group. In other words, when the PDCCH meets the preset condition, the HARQ information corresponding to the first channel group can be reset, regardless of the PDSCH scheduled by the PDCCH.

For example, when the terminal device receives a PDSCH that meets the preset condition, or receives a PDCCH and the PDCCH is used for scheduling a PDSCH that meets the preset condition, the terminal device resets the HARQ information corresponding to the first channel group.

Optionally, a time interval between the terminal device sending the HARQ information corresponding to the first channel group and the terminal device receiving the second channel is greater than or equal to a first preset value; and/or a time interval between the terminal device sending the HARQ information corresponding to the first channel group and the terminal device receiving the first indication information is greater than or equal to the first preset value.

The first preset value is determined by the network device according to its processing time. For example, the network device may determine its processing time for channels or signals such as PDSCH, PDCCH, PUCCH, and the like.

The first preset value may be configured by the network device for the terminal device, or defined in a protocol.

When the terminal device receives the second channel that meets the condition, if the time interval between the time point when the second channel is received and the time point when the HARQ information is transmitted, for example, the time point when the HARQ information is transmitted for the first or last time, is greater than or equal to the first preset value, the terminal device resets the HARQ information corresponding to the first channel group.

Similarly, when the terminal device receives the first indication information for indicating resetting of HARQ information, if the time interval between the time point when the first indication information is received and the time point when the HARQ information is transmitted, for example, the time point when the HARQ information is transmitted for the first or last time, is greater than or equal to the first preset value, the terminal device resets the HARQ information corresponding to the first channel group.

First, with reference to FIGS. 4 to 7, it is described how the terminal device resets the HARQ information based on the second channel that meets the preset condition.

In some embodiments, the preset condition includes: the HARQ process number of the second channel is the same as the HARQ process number of the first channel in the first channel group.

In some embodiments, if the HARQ process number of the second channel received by the terminal device is the same as the HARQ process number of any channel in the first channel group, the terminal device resets the HARQ corresponding to the first channel group.

After the terminal device receives a HARQ process scheduled by the network device, if it receives the HARQ process scheduled by the network device again, it indicates that the network device has obtained the HARQ information corresponding to the HARQ process scheduled last time. Therefore, the HARQ information corresponding to the channel group to which the previously-scheduled HARQ process belongs to can be cleared.

Figure 4:
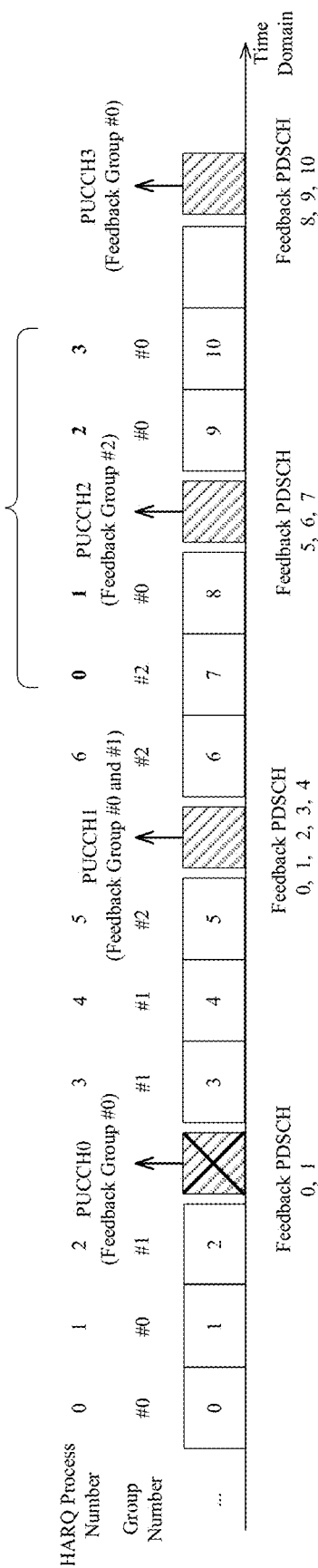
FIG. 4 is a schematic diagram of resetting HARQ information based on HARQ process number according to some embodiments of the application.

Taking FIG. 4 as an example, the network device indicates the terminal device to send the HARQ information corresponding to the first channel group, that is, channel group #0, on PUCCH resource 0, where channel group #0 includes PDSCH 0 and PDSCH 1, and HARQ process numbers of PDSCH 0 and PDSCH 1 are 0 and 1, respectively. If the terminal device fails to send the HARQ information corresponding to channel group #0 on PUCCH resource 0 due to LBT failure or other reasons, or the network device fails to detect the HARQ information corresponding to channel group #0 on PUCCH resource 0, then the network device can indicate the terminal device to retransmit the HARQ information corresponding to channel group #0 on PUCCH resource 1. As shown in FIG. 4, the network device indicates the terminal device to send HARQ information corresponding to channel group #0 and HARQ information corresponding to channel group #1 on PUCCH resource 1, where channel group #0 includes PDSCH 0 and PDSCH 1, channel group #1 includes PDSCH 2, PDSCH 3 and PDSCH 4.

Then, the network device sends channel group #2 to the terminal device, and channel group #2 includes PDSCH 5, PDSCH 6, and PDSCH 7. It can be found that the HARQ process number of PDSCH 7 in channel group #2 is the same as the HARQ process number of PDSCH 0 in channel group #0, and both are 0. So the terminal device can reset the HARQ information corresponding channel group #0 when receiving PDSCH 7.

Since the network device has repeatedly used the HARQ process number 0, it means that the HARQ information of a corresponding channel group previously using the HARQ process number 0 has been successfully received, and the HARQ process ends, so the terminal device can reset HARQ information of the first channel group.

In FIG. 4, the HARQ process number of PDSCH 8 is the same as the HARQ process number of PDSCH 1 in channel group #0, and both are 1. If the terminal device does not receive PDSCH 7, the terminal device can also reset the HARQ information corresponding to channel group #0 when receiving PDSCH 8. In other words, the second channel that meets the preset condition includes at least one of PDSCH 7 and PDSCH 8, that is, the terminal device resets the HARQ information corresponding to the first channel group when it receives PDSCH that meets the preset condition for the first time.

Similarly, the process numbers of PDSCH 9 and PDSCH 10 are 2 or 3, respectively, which are the same as the process numbers of PDSCH 2 and PDSCH 3 in channel group #1, respectively. Therefore, when the terminal device receives at least one of PDSCH 9 and PDSCH 10, the HARQ information corresponding to channel group #1 can be reset, that is, the HARQ information corresponding to PDSCH 2 and PDSCH 3 can be cleared.

Since the HARQ information corresponding to PDSCH 0 and PDSCH 1 in channel group #0 has been cleared, when the network device indicates the terminal device to send HARQ information corresponding to channel group #0 on PUCCH resource 3, the HARQ information is HARQ information corresponding to PDSCH 8, PDSCH 9, and PDSCH 10 in channel group #0.

Further, optionally, the terminal device resets the HARQ information corresponding to the first channel group when receiving the second channel and the second channel includes newly transmitted data.

For example, the terminal device may determine whether the second channel includes newly transmitted data through a new data indicator (NDI) included in the DCI used for scheduling the second channel. For example, when the NDI information is overturned, it indicates that the second channel includes newly transmitted data.

If only re-scheduling of the HARQ process is defined, one possible situation is that, when the network device does not receive HARQ information from the terminal device, the network device may treat the HARQ process previously scheduled to be received by the terminal device as a NACK. In order to avoid the terminal device from resetting the HARQ in the channel group by mistake in this situation, it can be further limited that, only when the terminal device receives rescheduling of the same HARQ process from the network device and data of the HARQ process includes newly transmitted data, that is, indicating that the network device receives ACK information corresponding to the HARQ process fed back by the terminal device last time, the terminal device considers that the HARQ information corresponding to the channel group to which the HARQ process belongs during the last feedback can be cleared.

In another implementation manner, the preset condition includes: a group number of a channel group to which the second channel belongs is the same as a group number of the first channel group.

In some embodiments, if the group number of the channel group to which the second channel received by the terminal device belongs is the same as the group number of the first channel group, the terminal device resets the HARQ information corresponding to the first channel group. This implementation is particularly suitable for HARQ feedback with a constant codebook size.

After the first uplink resource used for sending the HARQ information corresponding to the first channel group is determined, or after the HARQ information corresponding to the first channel group is sent on the first resource, if the terminal device again receives PDSCH belonging to the first channel group (i.e., the group number is the same) scheduled by the network device, since the codebook size of the HARQ codebook during the initial transmission and retransmission corresponding to the first channel group remains unchanged, the HARQ information corresponding to the PDSCH cannot be transmitted together with the HARQ information corresponding to the first channel group on first uplink resource, thereby indicating that the network device has obtained the HARQ information corresponding to the first channel group, so that the HARQ information corresponding to the first channel group can be cleared.

Figure 5:
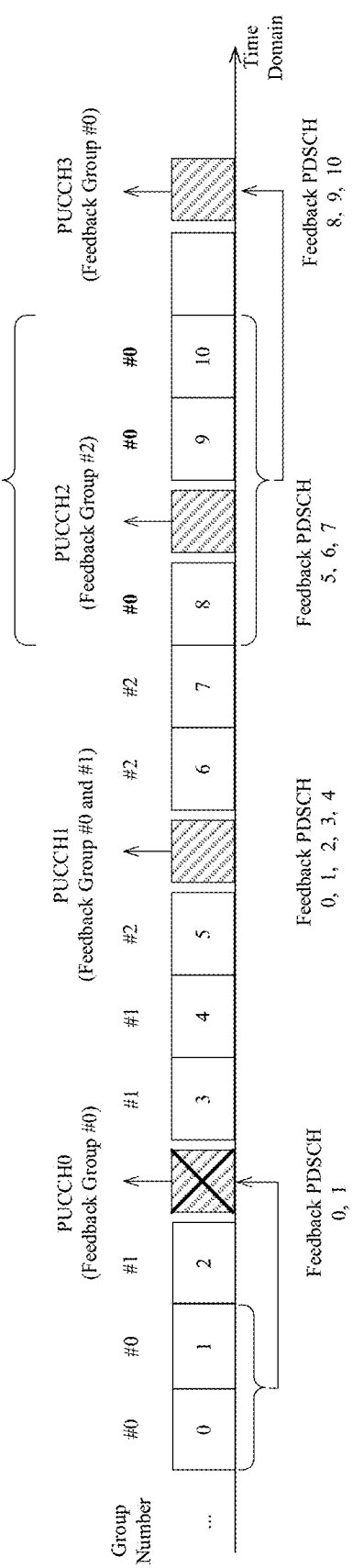
FIG. 5 is a schematic diagram of resetting HARQ information based on a group number of the channel group according to some embodiments of the application.

Taking FIG. 5 as an example, the network device indicates the terminal device to transmit the HARQ information corresponding to the first channel group, that is, channel group #0 on PUCCH resource 0, where channel group #0 includes PDSCH 0 and PDSCH 1. If the terminal device fails to send the HARQ information corresponding to channel group #0 on PUCCH resource 0 due to LBT failure or other reasons, or the network device fails to detect the HARQ information corresponding to channel group #0 on PUCCH resource 0, the network device can indicate the terminal device to retransmit the HARQ information corresponding to channel group #0 on PUCCH resource 1. As shown in FIG. 5, the network device indicates the terminal device to send HARQ information corresponding to channel group #0 and HARQ information corresponding to channel group #1 on PUCCH resource 1, where channel group #0 includes PDSCH 0 and PDSCH 1, channel group #1 includes PDSCH 2, PDSCH 3 and PDSCH 4. Then, the network device sends channel group #2 to the terminal device, where channel group #2 includes PDSCH 5, PDSCH 6 and PDSCH 7. The terminal device sends the HARQ information corresponding to channel group #2 on PUCCH resource 2 based on the indication of the network device.

After channel group #2, the network device sends PDSCH 8, PDSCH 9, and PDSCH 10 to the terminal device. It can be found that the group number of the channel group to which PDSCH 8, PDSCH 9, and PDSCH 10 belong is the same as the group number of the first channel group, and both are #0. Then, when the terminal device receives at least one of PDSCH 8, PDSCH 9, and PDSCH 10, since the group number of the channel group to which they belong is the same as the group number of the first channel group, the terminal device can reset the HARQ information corresponding to the first channel group, that is, reset the HARQ information corresponding to the channel group whose group number is #0. Since the network device has reused the group number #0, it means that the HARQ information of the channel group corresponding to the previously used group number #0 has been successfully received. Since the HARQ codebook size remains unchanged, the network device will not reuse the group number. Therefore, the terminal device can reset the HARQ information corresponding to the first channel group, that is, clear the HARQ information corresponding to PDSCH 0 and PDSCH 1.

Since the HARQ information corresponding to PDSCH 0 and PDSCH 1 in channel group #0 has been cleared, when the network device indicates the terminal device to send HARQ information corresponding to channel group #0 on PUCCH resource 3, the HARQ information is HARQ information corresponding to PDSCH 8, PDSCH 9, and PDSCH 10 in channel group #0.

Optionally, the second channel is located after the first uplink resource in the time domain, and the first uplink resource is used for sending HARQ information corresponding to the first channel group.

For example, the first uplink resource is determined by the terminal device according to HARQ timing indicator information corresponding to the channels in the first channel group.

For another example, the first uplink resource is an uplink resource used when the terminal device transmits the HARQ information corresponding to the first channel group for the first time.

The second channel is located after the first uplink resource, that is, after the terminal device initially transmits the HARQ information corresponding to the first channel group on the first uplink resource, if the terminal device receives the second channel that meets the condition, or if the terminal device receives the second channel that meets the condition and a time interval between the second channel and the first uplink resource is greater than or equal to a first preset value, the terminal device resets the HARQ information corresponding to the first channel group.

Optionally, the second uplink resource is located after the first uplink resource, and the second uplink resource is used for sending HARQ information corresponding to the channel group to which the second channel belongs. The second uplink resource may be, for example, determined by the terminal device according to the HARQ timing indicator information corresponding to the second channel.

After transmitting the HARQ information corresponding to the first channel group on the first uplink resource, the terminal device receives the second channel, and determines the second uplink resource based on the HARQ timing indicator information of the channel in the channel group to which the second channel belongs. Since the HARQ codebook size for the two feedbacks remains unchanged, when the terminal device needs to feed back HARQ information corresponding to the channel group with the same group number on two PUCCH resources according to the indication of the network device, it means that the group number is reused by the network device. So the network device should have received the HARQ information corresponding to the first channel group transmitted on the first PUCCH resource, so the terminal device can clear the HARQ information of each channel in the first channel group transmitted on the first PUCCH resource at this time.

It can also be understood that after the first uplink resource used for sending the HARQ information corresponding to the first channel group is determined, or after the HARQ information corresponding to the first channel group is sent on the first resource, if the terminal device receives PDSCH scheduled by the network device and belonging to the first channel group (that is, the group number is the same), and the network device, upon scheduling the PDSCH, newly indicates the second uplink resource used for transmitting its HARQ information, because the HARQ codebook size corresponding to the first channel group remains unchanged for initial transmission and retransmission, the HARQ information corresponding to the PDSCH cannot be transmitted together with the HARQ information corresponding to the first channel group on the first uplink resource. It means that the network device has obtained the HARQ information corresponding to the first channel group, so that the HARQ information corresponding to the first channel group can be cleared.

Figure 6:
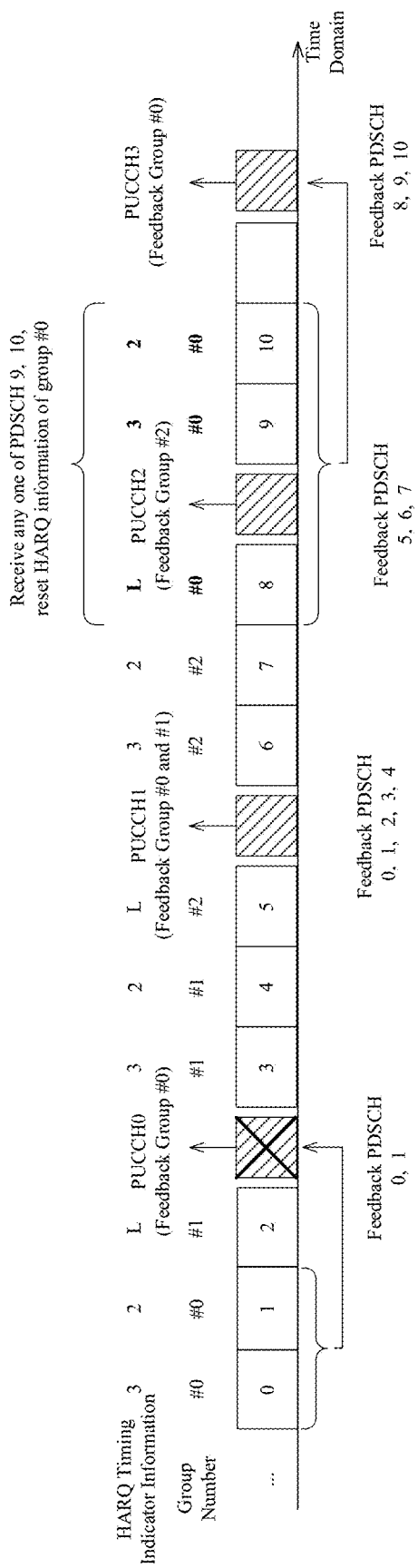
FIG. 6 is a schematic diagram of resetting HARQ information based on a group number of the channel group according to some embodiments of the application.

Taking FIG. 6 as an example, the network device indicates the terminal device to send the HARQ information corresponding to the first channel group, which is channel group #0, on PUCCH resource 0, where channel group #0 includes PDSCH 0 and PDSCH 1, and the HARQ timing indicator information corresponding to PDSCH 0 and PDSCH 1 is 3 and 2, respectively. The HARQ timing indicator information is 3 indicates that the difference between PDSCH 0 and PUCCH resource 0 is 3 time slots. Similarly, the HARQ timing indicator information is 2 indicates that the difference between PDSCH 1 and PUCCH resource 0 is 2 time slots. The HARQ timing indicator information L in FIG. 6 indicates that the network device has not yet determined the feedback position of the HARQ information of the PDSCH.

If the terminal device fails to send the HARQ information corresponding to channel group #0 on PUCCH resource 0 due to LBT failure or other reasons, or the network device fails to detect the HARQ information corresponding to the channel group #0 on PUCCH resource 0, then the network device can indicate the terminal device to retransmit the HARQ information corresponding to channel group #0 on PUCCH resource 1. As shown in FIG. 6, the network device indicates the terminal device to send HARQ information corresponding to channel group #0 and HARQ information corresponding to channel group #1 on PUCCH resource 1, where channel group #0 includes PDSCH 0 and PDSCH 1, channel group #1 includes PDSCH 2, PDSCH 3 and PDSCH 4. Then, the network device sends channel group #2 to the terminal device, where the channel group #2 includes PDSCH 5, PDSCH 6 and PDSCH 7. The terminal device sends the HARQ information corresponding to channel group #2 on PUCCH resource 2 based on the indication of the network device.

After channel group #2, the network device sends PDSCH 8, PDSCH 9, and PDSCH 10 to the terminal device. It can be found that the group number of the channel group to which PDSCH 8, PDSCH 9, and PDSCH 10 belong is the same as the group number of the first channel group, and both are #0. In addition, before receiving PDSCH 8, PDSCH 9 and PDSCH 10, the terminal device has already sent HARQ information of channel group #0 on PUCCH resource 0 and/or PUCCH resource 1. In other words, PDSCH 8, PDSCH 9, and PDSCH 10 are received after PUCCH resource 0 and/or PUCCH resource 1. Moreover, according to the HARQ timing indicator information of PDSCH 9 and PDSCH 10, the terminal device can determine the second uplink resource used for transmitting HARQ information corresponding to channel group #0, namely PUCCH resource 3. Then the terminal device can reset the HARQ information corresponding to the first channel group, that is, clear the HARQ information corresponding to the PDSCH 0 and PDSCH 1.

Since the HARQ information corresponding to PDSCH 0 and PDSCH 1 in channel group #0 has been cleared, when the network device indicates the terminal device to send the HARQ information corresponding to channel group #0 on PUCCH resource 3, the terminal device sends the HARQ information corresponding to PDSCH 8, PDSCH 9, and PDSCH 10 in channel group #0 on PUCCH resource 3.

Further, optionally, when the terminal device receives the second channel, and a value of second downlink assignment index (DAI) information corresponding to the second channel is less than or equal to a value of first DAI information corresponding to the first channel in the first channel group, the terminal device resets the HARQ information corresponding to the first channel group.

Herein, the value of the first DAI information is used for indicating a position of the first channel in the first channel group, and the value of the second DAI information is used for indicating a position of the second channel in the channel group to which it belongs.

In some embodiments of the application, the number of data channels in each channel group is less than or equal to a second preset value. The second preset value may be configured by the network device for the terminal device, or is defined in a protocol.

Taking the second preset value equal to 4 as an example, each channel group can include up to four PDSCHs. It is assumed that the first channel group includes PDSCH 0, PDSCH 1, PDSCH 2, and PDSCH 3 in sequence. Herein, the values of DAI information can be 00, 01, 10, 11, which are used for indicating the position of each PDSCH among the 4 PDSCHs. For example, the value of DAI information corresponding to PDSCH 0 is 00, then PDSCH 0 is the first PDSCH of these 4 PDSCHs; the value of DAI information corresponding to PDSCH 1 is 01, then PDSCH 1 is the second PDSCH of these 4 PDSCHs; the value of DAI information corresponding to PDSCH 2 is 10, then PDSCH 2 is the third PDSCH of these 4 PDSCHs; the value of DAI information corresponding to PDSCH 3 is 11, then PDSCH 3 is the last PDSCH of these 4 PDSCHs.

Figure 7:
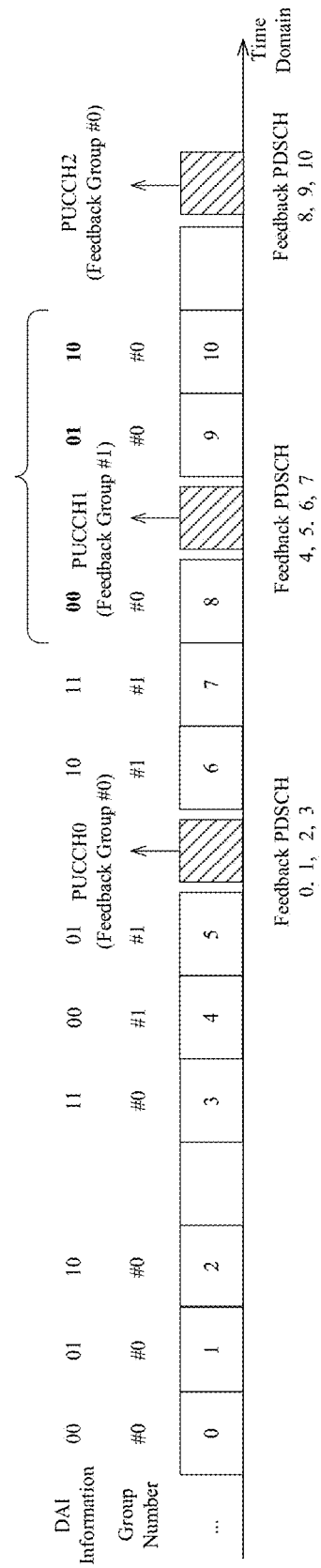
FIG. 7 is a schematic diagram of resetting HARQ information based on a group number of the channel group according to some embodiments of the application.

Taking FIG. 7 as an example, the network device indicates the terminal device to send the HARQ information corresponding to the first channel group, which is channel group #0, on PUCCH resource 0, where channel group #0 includes PDSCH 0, PDSCH 1, PDSCH 2, and PDSCH 3, and the values of DAI information of PDSCH 0, PDSCH 1, PDSCH 2 and PDSCH 3 are 00, 01, 10, and 11, respectively.

The network device indicates the terminal device to send the HARQ information corresponding to channel group #1 on PUCCH resource 1, where channel group #1 includes PDSCH 4, PDSCH 5, PDSCH 6, and PDSCH 7, and the DAI information of PDSCH 4, PDSCH 5, PDSCH 6, and PDSCH 7 is valued 00, 01, 10, and 11, respectively.

After channel group #1, the network device sends PDSCH 8, PDSCH 9, and PDSCH 10 to the terminal device, and the DAI information of PDSCH 8, PDSCH 9, and PDSCH 10 is valued 00, 01, and 10, respectively. It can be found that the group number of the channel group to which PDSCH 8, PDSCH 9 and PDSCH 10 belong is the same as the group number of the first channel group, which is #0; and the values of DAI information of PDSCH 8, PDSCH 9 and PDSCH 10 are respectively the same as the values of DAI information of PDSCH 0, PDSCH 1, and PDSCH 2 in the first channel group. Taking PDSCH 8 as an example, the group number of the channel group to which PDSCH 8 belongs is #0, the value of DAI information of PDSCH 8 is 00, and the value of DAI information of PDSCH 8 is equal to the value of DAI information of PDSCH 0 in the first channel group and smaller than the values of the DAI information of PDSCH 1 and PDSCH 2 in the first channel group. Since the PDSCH 8 meets the conditions of the group number and DAI information at the same time, the terminal device resets the HARQ information corresponding to the first channel group when the PDSCH 8 is received by the terminal device, that is, clears the HARQ information corresponding to PDSCH 0 to PDSCH 3.

Since the HARQ information of PDSCH 0, PDSCH 1, and PDSCH 2 in channel group #0 has been cleared, when the network device indicates the terminal device to send HARQ information corresponding to channel group #0 on PUCCH resource 3, the terminal device sends the HARQ information corresponding to PDSCH 8, PDSCH 9, and PDSCH 10 in channel group #0 on PUCCH resource 3.

The value of DAI information in each channel group can only appear once at most. Therefore, when the same DAI value appears in a channel group with the same group number, it can be considered that when the DAI value appears later, the HARQ information corresponding to the channel group can be reset.

In FIGS. 5 to 7, the codebook size of the HARQ information corresponding to channel group #0 remains unchanged, which means that the codebook size of the HARQ information for the same PDSCH does not change each time. But after the HARQ information corresponding to channel group #0 is reset, the codebook size of the HARQ information of new PDSCH included in the channel group with the group number #0 may be different from the codebook size of the HARQ information corresponding to the channel group #0 before the reset. Taking FIG. 7 as an example, the codebook size of the HARQ information corresponding to PDSCH 0 to PDSCH 3 in channel group #0 remains unchanged during initial transmission and retransmission. But when it is cleared, the channel group with the group number #0 includes PDSCH 8 to PDSCH 10, it can be seen that the codebook size of the HARQ information corresponding to PDSCH 8 to PDSCH 10 is smaller than the codebook size of the HARQ information corresponding to PDSCH 0 to PDSCH 3. Similarly, the codebook size of the HARQ information corresponding to PDSCH 8 to PDSCH 10 remains unchanged during initial transmission and retransmission.

Figures 8, 9:
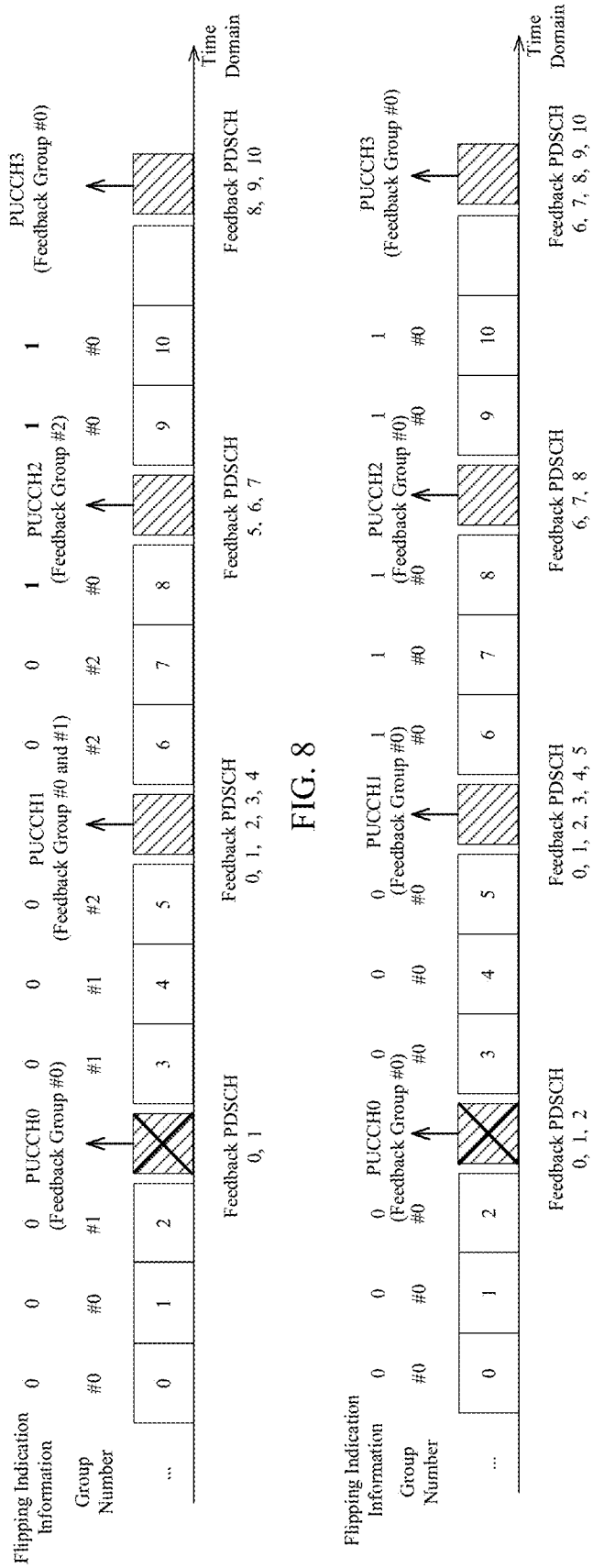
FIG. 8 is a schematic diagram of resetting HARQ information based on flipping indication information according to some embodiments of the application.
FIG. 9 is a schematic diagram of resetting HARQ information based on flipping indication information according to some embodiments of the application.

The following describes how the terminal device resets the HARQ information based on the first indication information for indicating the resetting of the HARQ information with reference to FIG. 8 and FIG. 9.

In some embodiments, if the terminal device receives the first indication information, the HARQ corresponding to the first channel group is reset. This method can be applied to the HARQ feedback mode with a constant codebook size, and can also be applied to the HARQ feedback mode with a variable codebook size.

The first indication information may be, for example, flipping indication information, that is, a flipping bit. The flipping bit can be sent together with the downlink grant (DL grant). When the value of the flipping bit is flipped, for example, from 0 to 1 or from 1 to 0, it indicates the end of HARQ information of the downlink channel in the channel group corresponding to the flipping bit and before the flipping moment.

The first indication information may also be carried in other DCIs, for example, carried in an uplink grant (UL grant) or DCI not used for uplink and downlink scheduling, which is not limited here.

The flipping indication information takes effect only under certain conditions, so as to prevent the terminal device from resetting the HARQ information corresponding to a certain channel group before transmitting, thereby ensuring the reliability of HARQ feedback.

Taking FIG. 8 as an example, FIG. 8 shows the HARQ feedback mode with a constant HARQ codebook size. The network device indicates the terminal device to send the HARQ information corresponding to the first channel group, namely channel group #0, on PUCCH resource 0, where channel group #0 includes PDSCH 0 and PDSCH 1, and the flipping indication information corresponding to PDSCH 0 and PDSCH 1 is 0. If the terminal device fails to send the HARQ information corresponding to channel group #0 on PUCCH resource 0 due to LBT failure or other reasons, or the network device fails to detect the HARQ information corresponding to the channel group #0 on PUCCH resource 0, then the network device can indicate the terminal device to retransmit the HARQ information corresponding to channel group #0 on PUCCH resource 1. As shown in FIG. 8, the network device indicates the terminal device to send HARQ information corresponding to channel group #0 and HARQ information corresponding to channel group #1 on PUCCH resource 1, where channel group #0 includes PDSCH 0 and PDSCH 1, channel group #1 includes PDSCH 2, PDSCH 3, and PDSCH 4, and the flipping indication information corresponding to each channel in channel group #0 and channel group #1 is 0. Then, the network device sends channel group #2 to the terminal device, where the channel group #2 includes PDSCH 5, PDSCH 6, and PDSCH 7, and the flipping indication information corresponding to PDSCH 5, PDSCH 6, and PDSCH 7 is 0. The terminal device sends the HARQ information corresponding to channel group #2 on PUCCH resource 2 based on indication of the network device.

After channel group #2, the network device sends PDSCH 8, PDSCH 9, and PDSCH 10 to the terminal device. It can be found that the flipping indication information corresponding to PDSCH 8, PDSCH 9 and PDSCH 10 becomes 1, so the terminal device can reset the HARQ information corresponding to the first channel group, that is, clear the HARQ information corresponding to PDSCH 0 and PDSCH 1.

Since the HARQ information of PDSCH 0 and PDSCH 1 in the first channel group has been cleared, when the network device indicates the terminal device to send the HARQ information corresponding to channel group #0 on PUCCH resource 3, the terminal device sends HARQ information corresponding to PDSCH 8, PDSCH 9, and PDSCH 10 in channel group #0 on PUCCH resource 3.

Another example is the HARQ feedback mode with a variable HARQ codebook size shown in FIG. 9. The network device indicates the terminal device to send the HARQ information corresponding to the first channel group, namely channel group #0, on PUCCH resource 0. At this time, channel group #0 includes PDSCH 0 and PDSCH 1, and the flipping indication information corresponding to PDSCH 0 and PDSCH 1 is 0. When the terminal device fails to send the HARQ information corresponding to channel group #0 on PUCCH resource 0 due to LBT failure or other reasons, or the network device fails to detect the HARQ information corresponding to the channel group #0 on PUCCH resource 0, the network device can indicate the terminal device to retransmit the HARQ information corresponding to channel group #0 on PUCCH resource 1. As shown in FIG. 9, the network device indicates the terminal device to send HARQ information corresponding to channel group #0 on PUCCH resource 1. At this time, channel group #0 includes PDSCH 0, PDSCH 1, PDSCH 2, PDSCH 3, PDSCH 4, and PDSCH 5, and the flipping indication information corresponding to each channel in the channel group #0 is still 0.

Then, the network device sends PDSCH 6, PDSCH 7, and PDSCH 8 to the terminal device. Since the flipping indication information corresponding to PDSCH 6, PDSCH 7 and PDSCH 8 becomes 1, the terminal device can reset the HARQ information corresponding to the first channel group, that is, clear the HARQ information corresponding to PDSCH 0 to PDSCH 5.

Since the HARQ information of PDSCH 0 to PDSCH 5 in channel group #0 has been cleared, when the network device indicates the terminal device to send the HARQ information corresponding to channel group #0 on PUCCH resource 2, the terminal device sends HARQ information corresponding to PDSCH 6, PDSCH 7, and PDSCH 8 in the channel group #0 on PUCCH resource 2.

For PDSCH 9 and PDSCH 10, since the flipping indication information corresponding to PDSCH 9 and PDSCH 10 is still 1, when the network device indicates the terminal device to send HARQ information corresponding to channel group #0 on PUCCH resource 3, the terminal device sends HARQ information corresponding to PDSCH 6 to PDSCH 10 in channel group #0 on PUCCH resource 3.

In the embodiment of FIG. 8 or FIG. 9, for the same channel group such as channel group #0, the terminal device sends HARQ information corresponding to channel group #0 at least once before the terminal device receives the flipped first indication information. Optionally, a time interval between the terminal device sending the HARQ information corresponding to the channel group #0 and the terminal device receiving the flipped first indication information is greater than or equal to a first preset value.

Optionally, for the same channel group, for example, channel group #0, if the terminal device does not send the HARQ information corresponding to channel group #0 before the terminal device receives the flipped first indication information, or the time interval between the terminal device sending the HARQ information corresponding to channel group #0 and the terminal device receiving the flipped first indication information is less than the first preset value, the terminal device resets the HARQ information corresponding to channel group #0 according to the first indication information, or in other words, the terminal device discards the HARQ information, which corresponds to channel group #0 before the first indication information is flipped.

Based on the above description, the terminal device resets the HARQ information corresponding to the first channel group when it receives the second channel that meets the condition or receives the first indication information for indicating resetting of HARQ information, so that the terminal device can flexibly process the HARQ information, thereby reducing the bit overhead in transmission of the HARQ information, and realizing effective transmission of HARQ information on the unlicensed spectrum.

Figure 10:
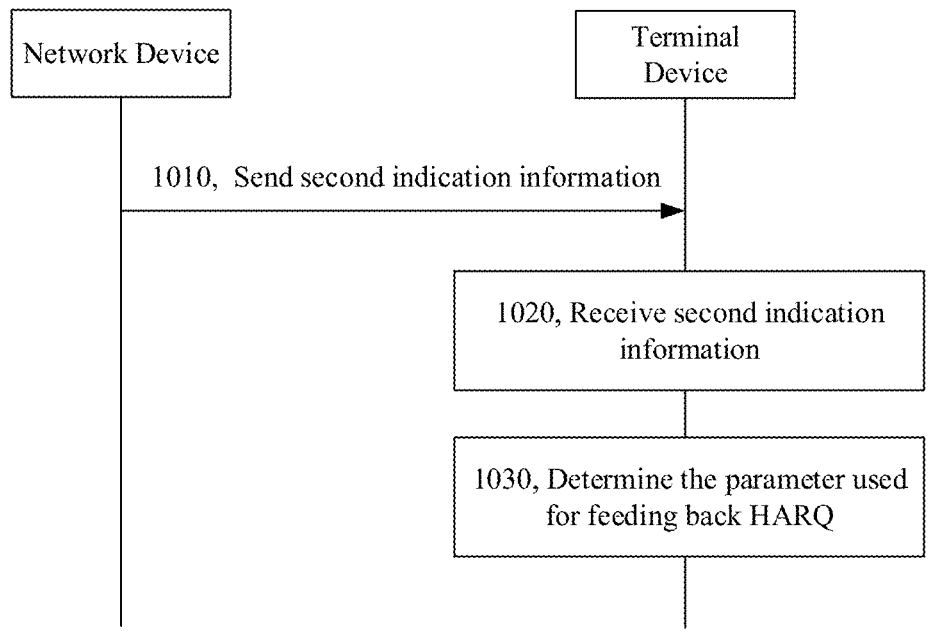
FIG. 10 is a schematic flowchart of the method for feeding back HARQ information according to another embodiment of the application.

FIG. 10 shows a HARQ information feedback method 1000 according to an embodiment of the application. This method may be executed by a terminal device and a network device. The network device may be, for example, the network device 110 in FIG. 1 described above, and the terminal device may be, for example, the terminal device 120 in FIG. 1 described above. This method can be applied to unlicensed spectrum or licensed spectrum. As shown in FIG. 10, the method includes some or all of the following steps.

In 1010, the network device sends second indication information to the terminal device, where the second indication information indicates a parameter for feeding back HARQ information.

The parameter may include, for example, a group number, a channel group reset command, and the like. The channel group reset command is used by the terminal device to determine whether to reset the HARQ information corresponding to the channel group with the group number.

In 1020, the terminal device receives the second indication information sent by the network device.

In 1030, the terminal device determines the parameter for feeding back HARQ information according to the second indication information.

Optionally, the method further includes: the network device sends third indication information to the terminal device; correspondingly, the terminal device receives the third indication information, where the third indication information is used for indicating a feedback mode of HARQ information. The third indication information may be, for example, high-level signaling, such as radio resource control (RRC) signaling.

Herein, the feedback mode of HARQ information includes a first feedback mode and a second feedback mode. In the first feedback mode, the HARQ information corresponding to the channel group with the same group number transmitted by the terminal device each time has the same codebook size. In the second feedback mode, the HARQ information corresponding to the channel group with the same group number transmitted by the terminal device each time has the variable codebook size, for example, the codebook size is variable based on the flipping indication information received by the terminal device.

The first feedback mode is the aforementioned HARQ feedback mode with the same codebook size, such as mode 1 shown in FIG. 2. Optionally, when the terminal device uses the first feedback mode to feed back the HARQ information corresponding to the first channel group, the terminal device can reset the HARQ information corresponding to the channel group according to the method described in the foregoing FIG. 3, that is, the terminal device resets the HARQ information corresponding to the first channel group when receiving the second channel that meets the preset condition, and/or when receiving the first indication information for indicating to reset the HARQ information. For details on how to reset the HARQ information corresponding to the first channel group when the terminal device adopts the first feedback mode, reference may be made to the foregoing description of FIGS. 3 to 9. For brevity, details are not repeated here.

The second feedback mode is the aforementioned HARQ feedback mode with the variable codebook size, for example, mode 2 shown in FIG. 2. Optionally, when the terminal device uses the second feedback mode to feed back the HARQ information corresponding to the first channel group, the terminal device determines whether to reset the HARQ information corresponding to the first channel group according to the flipping indication information. For example, when the terminal device receives the second channel and the value of the flipping indication information corresponding to the second channel changes, the terminal device resets the HARQ information corresponding to the first channel group, where the group number of the channel group to which the second channel belongs is the same as the group number of the first channel group.

Figure 11:
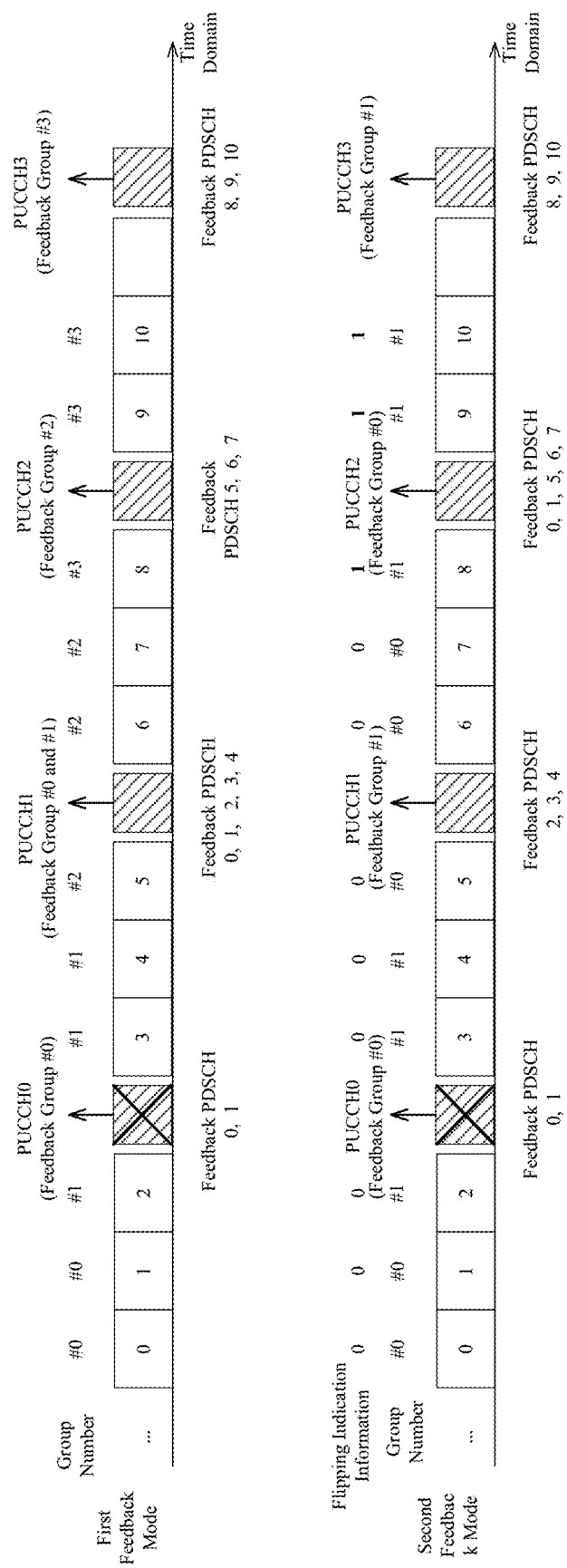
FIG. 11 is a schematic diagram of two different HARQ feedback manners according to some embodiments of the application.

Taking FIG. 11 as an example, if the terminal device adopts the first feedback mode, the HARQ codebook size corresponding to the channel group with the same group number that is fed back each time remains unchanged. Based on the indication of the network device, the terminal device sends the HARQ information corresponding to channel group #0 on PUCCH resource 0, where channel group #0 includes PDSCH 0 and PDSCH 1; sends the HARQ information corresponding to channel group #0 and channel group #1 on PUCCH resource 1, where channel group #0 includes PDSCH 0 and PDSCH 1, and its corresponding HARQ codebook size remains unchanged, channel group #1 includes PDSCH 2 to PDSCH 4; sends the HARQ information corresponding to channel group #2 on PUCCH resource 2, where channel group #2 includes PDSCH 5 to PDSCH 7; and sends the HARQ information corresponding to channel group #3 on PUCCH resource 3, where channel group #3 includes PDSCH 8 to PDSCH 10.

If the terminal device adopts the second feedback mode, the HARQ codebook size corresponding to the channel group with the same group number that is fed back each time can be changed. Based on the indication of the network device, the terminal device sends the HARQ information corresponding to channel group #0 on PUCCH resource 0, where channel group #0 includes PDSCH 0 and PDSCH 1; sends the HARQ information corresponding to channel group #1 on PUCCH resource 1, where channel group #1 includes PDSCH 2 to PDSCH 4; sends the HARQ information corresponding to channel group #0 on PUCCH resource 2, where channel group #0 includes PDSCH 0, PDSCH 1, PDSCH 5, PDSCH 6, and PDSCH 7 at this time, with the size of corresponding HARQ codebook being changed; and sends the HARQ information corresponding to channel group #1 on PUCCH resource 3. Since the flipping indication information corresponding to PDSCH 8 to PDSCH 10 changes from 0 to 1, the terminal device resets the HARQ information corresponding to channel group #1, where channel group #1 includes PDSCH 8 to PDSCH 10 at this time, and the terminal device sends the HARQ information corresponding to PDSCH 8 to PDSCH 10 on PUCCH resource 3.

Optionally, the downlink grant sent by the network device to the terminal device includes N-bit of second indication information, and the second indication information is used by the terminal device to determine related information of the HARQ feedback, where N is a positive integer, for example, N=2.

If the terminal device adopts the first feedback mode, the N bits are used for indicating the downlink grant or the group number to which the PDSCH scheduled by the downlink grant belongs.

Herein, how to reset the HARQ information corresponding to the channel group can be implemented in an implicit manner, for example, any one of the methods described in FIGS. 3 to 9 may be used. In other words, if the terminal device is configured to use the first feedback mode to perform HARQ feedback, the HARQ feedback indication field is the information in which the N bits in the second indication information are configured as the group number.

If the terminal device adopts the second feedback mode, N1 bit(s) of the N bits is used for indicating the downlink grant or the group number to which the PDSCH scheduled by the downlink grant belongs; and N2 bit(s) (for example, the other 1 bit) of the N bits is used for indicating whether the HARQ information corresponding to the channel group of the group number is reset.

In other words, if the terminal device is configured to use the second feedback mode for HARQ feedback, the HARQ feedback indication field includes two information fields in the second indication information, one of the information fields includes N1 bit(s) of the N bits, and the N1 bit(s) is configured as a channel group reset command, and the other information field includes N2 bit(s) of the N bits, and the N2 bit(s) is configured as group number information. For example, N=2, N1=N2=1.

It should be understood that the first feedback mode has a shorter time delay, but requires more channel groups. The second feedback method requires fewer channel groups, but the feedback delay is longer, and the HARQ codebook for feedback may be larger. In specific implementation, the network device can select an appropriate HARQ feedback mode based on different scenarios and indicate the terminal device.

In this way, regardless of whether the network device configures the first feedback mode or the second feedback mode for the terminal device, the overhead of dynamic signaling used for determining relevant information of the HARQ feedback in DCIs in the downlink grant is the same, and the flexibility of HARQ feedback configuration can be achieved without requiring additional overhead of dynamic signaling or increasing the complexity of blind detection of the terminal device.

It should be noted that, under the premise of no conflict, the various embodiments described in this application and/or the technical features in each embodiment can be combined with each other arbitrarily, and the technical solutions obtained after the combination should also fall within the protection scope of this application.

In the various embodiments of the application, the size of the sequence number of the above-mentioned processes does not mean the order of execution. The execution order of each process should be determined by its function and internal logic, and should not constitute any limitation on the implementation process of the embodiments of the application.

The message transmission method according to some embodiments of the application is described in detail above. The device according to some embodiments of the application will be described below with reference to FIG. 12 to FIG. 17. The technical features described in the method embodiments are applicable to the following device embodiments.

Figure 12:
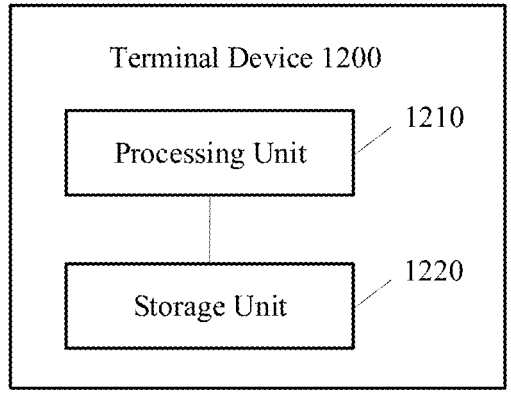
FIG. 12 is a schematic block diagram of the terminal device according to some embodiments of the application.

FIG. 12 is a block diagram of a terminal device 1200 according to some embodiments of the application. As shown in FIG. 12, the terminal device 1200 includes a processing unit 1210 and a storage unit 1220.

The processing unit 1210 is configured to determine HARQ information corresponding to the first channel group.

The storage unit 1220 is configured to buffer HARQ information corresponding to the first channel group.

The processing unit 1210 is further configured to control the storage unit to reset the HARQ information corresponding to the first channel group when the terminal device receives a second channel meeting a preset condition, and/or when the terminal device receives first indication information used for indicating resetting of HARQ information.

In some embodiments, the preset condition includes: an HARQ process number of the second channel is the same as an HARQ process number of a first channel in the first channel group, and/or a group number of a channel group to which the second channel belongs is the same as a group number of the first channel group.

Therefore, the terminal device determines whether it needs to start the DRX duration timer in the DRX cycle after wake-up signal according to whether the wake-up signal sent by the network device is detected, so that there is no need to monitor the PDCCH when there is no need to wake-up, thereby further reducing the power consumption of the terminal device in the DRX process.

Optionally, before the terminal device receives the second channel, and/or before the terminal device receives the first indication information, the terminal device has sent HARQ information corresponding to the first channel group for at least once.

Optionally, the terminal device has sent the HARQ information corresponding to the first channel group for multiple times, and codebook sizes of the HARQ information corresponding to the first channel group sent for multiple times are the same or different.

Optionally, a time interval between the terminal device sending the HARQ information corresponding to the first channel group and the terminal device receiving the second channel is greater than or equal to a first preset value, and/or a time interval between the terminal device sending the HARQ information corresponding to the first channel group and the terminal device receiving the first indication information is greater than or equal to the first preset value.

Optionally, the first preset value is determined by a network device according to a processing time of the network device.

Optionally, the first preset value is configured by a network device for the terminal device, or defined in a protocol.

Optionally, the preset condition comprises the HARQ process number of the second channel is the same as the HARQ process number of the first channel in the first channel group, wherein the processing unit 1210 is specifically configured to reset the HARQ information corresponding to the first channel group when the terminal device receives the second channel and the second channel comprises newly transmitted data.

Optionally, the preset condition comprises the group number of the channel group to which the second channel belongs is the same as the group number of the first channel group, wherein the processing unit 1210 is specifically configured toreset the HARQ information corresponding to the first channel group when the terminal device receives the second channel and a value of second downlink assignment index DAI information corresponding to the second channel is less than or equal to a value of first DAI information corresponding to the first channel, wherein the value of the first DAI information is used for indicating a location of the first channel in the first channel group, and the value of the second DAI information is used for indicating a location of the second channel in the channel group to which the second channel belongs.

Optionally, wherein the preset condition comprises the group number of the channel group to which the second channel belongs is the same as the group number of the first channel group, and the second channel is located after a first uplink resource in time domain, and the first uplink resource is used for sending the HARQ information corresponding to the first channel group.

Optionally, the first uplink resource is used by the terminal device when sending the HARQ information corresponding to the first channel group for the first time, and/or the first uplink resource is determined by the terminal device according to HARQ timing indicator information corresponding to a channel in the first channel group.

Optionally, a second uplink resource is located after the first uplink resource, the second uplink resource is used for sending HARQ information corresponding to the channel group to which the second channel belongs, and the second uplink resource is determined by the terminal device according to HARQ timing indicator information corresponding to the second channel.

Optionally, a number of data channels in each channel group is less than or equal to a second preset value.

Optionally, the second preset value is configured by a network device for the terminal device, or is defined in a protocol.

Optionally, the terminal device receiving the second channel meeting the preset condition comprises: the terminal device receiving a downlink channel meeting the preset condition and used for scheduling the second channel, or the terminal device receiving data carried in the second channel meeting the preset condition.

It should be understood that the terminal device 1200 can perform corresponding operations performed by the terminal device in the method 300 of some embodiments of the application, and for the sake of brevity, details are not described herein again.

Figure 13:
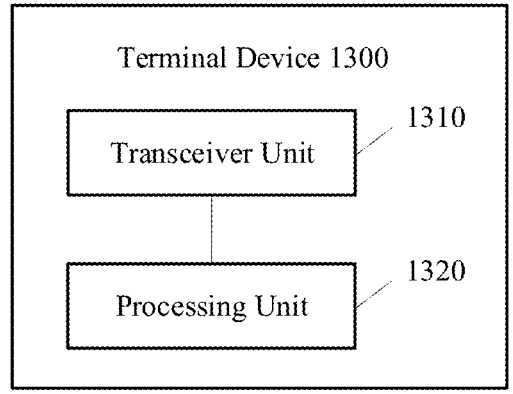
FIG. 13 is a schematic block diagram of the terminal device according to some embodiments of the application.

FIG. 13 is a block diagram of a terminal device 1300 according to some embodiments of the application. As shown in FIG. 13, the terminal device 1300 includes a transceiver unit 1310 and a processing unit 1320.

The transceiver unit 1310 is configured to receive second indication information sent by the network device, where the second indication information indicates a parameter used for feeding back HARQ information.

The processing unit 1320 is configured to determine the parameter for feeding back HARQ information according to the second indication information.

Optionally, the method further includes: the terminal device receives third indication information sent by the network device, where the third indication information is used for indicating a feedback mode of HARQ information. The third indication information may be, for example, high-layer signaling, such as RRC signaling.

In some embodiments, the feedback mode of HARQ information includes a first feedback mode and a second feedback mode. In the first feedback mode, the HARQ information corresponding to the channel group with the same group number transmitted by the terminal device each time has the same codebook size. In the second feedback mode, the HARQ information corresponding to the channel group with the same group number transmitted by the terminal device each time has the variable codebook size, for example, the codebook size is variable based on the flipping indication information received by the terminal device.

Optionally, when the terminal device uses the first feedback mode to feed back HARQ information corresponding to the first channel group, the processing unit 1320 is specifically configured to reset the HARQ information corresponding to the first channel group when receiving a second channel that meets a preset condition, and/or when receiving the first indication information for indicating to reset the HARQ information.

Optionally, when the terminal device uses the second feedback mode to feed back the HARQ information corresponding to the first channel group, the processing unit 1320 is specifically configured to, when the second channel is received and the value of the flipping indication information corresponding to the second channel changes, the terminal device resets the HARQ information corresponding to the first channel group, where the group number of the channel group to which the second channel belongs is the same as the group number of the first channel group.

It should be understood that the terminal device 1300 can perform the corresponding operations performed by the terminal device in the method 1000 of some embodiments of the application, and for the sake of brevity, details are not described herein again.

Figure 14:
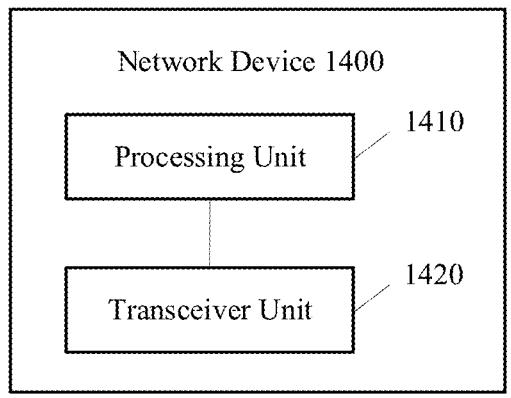
FIG. 14 is a schematic block diagram of the network device according to some embodiments of the application.

FIG. 14 is a block diagram of a network device 1400 according to some embodiments of the application. As shown in FIG. 14, the network device 1400 includes a processing unit 1410 and a sending unit 1420.

The processing unit 141 is configured to generate second indication information, where the second indication information indicates a parameter for feeding back HARQ information.

The sending unit 1420 is configured to send the second indication information to the terminal device.

Optionally, the method further includes: the network device sends third indication information to the terminal device, where the third indication information is used for indicating a feedback mode of HARQ information. The third indication information may be, for example, high-layer signaling, such as RRC signaling.

In some embodiments, the feedback mode of HARQ information includes a first feedback mode and a second feedback mode. In the first feedback mode, the HARQ information corresponding to the channel group with the same group number transmitted by the terminal device each time has the same codebook size. In the second feedback mode, the HARQ information corresponding to the channel group with the same group number transmitted by the terminal device each time has the variable codebook size, for example, the codebook size is variable based on the flipping indication information received by the terminal device.

It should be understood that the network device 1400 can perform the corresponding operations performed by the network device in the method 1000 of some embodiments of the application, which is not repeated here for brevity.

Figure 15:
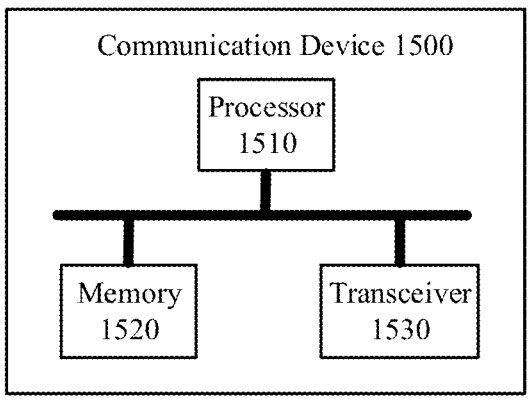
FIG. 15 is a schematic block diagram of the communication device according to some embodiments of the application.

FIG. 15 is a block diagram of a communication device 1500 according to some embodiments of the application. The communication device 1500 shown in FIG. 15 includes a processor 1510, and the processor 1510 can call and run a computer program from the memory to implement the method in some embodiments of the application.

Optionally, as shown in FIG. 15, the communication device 1500 may further include a memory 1520. The processor 1510 may call and run a computer program from the memory 1520 to implement the method in some embodiments of the application.

The memory 1520 may be a separate device independent of the processor 1510, or may be integrated in the processor 1510.

Optionally, as shown in FIG. 15, the communication device 1500 may further include a transceiver 1530, and the processor 1510 may control the transceiver 1530 to communicate with other devices, specifically, it may send information or data to other devices, or receive information or data sent by other devices.

In some embodiments, the transceiver 1530 may include a transmitter and a receiver. The transceiver 1530 may further include an antenna, and the number of antennas may be one or more.

Optionally, the communication device 1500 may specifically be the terminal device according to some embodiments of the application, and the communication device 1500 may implement the corresponding process implemented by the terminal device in each method according to the embodiments of the application. For brevity, details are not repeated here.

Optionally, the communication device 1500 may specifically be the network device according to some embodiments of the application, and the communication device 1500 may implement the corresponding process implemented by the network device in each method according to the embodiments of the application. For brevity, details are not repeated here.

Figure 16:
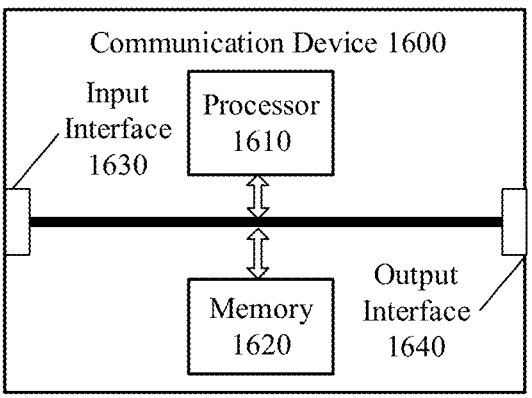
FIG. 16 is a schematic block diagram of the communication device according to some embodiments of the application.

FIG. 16 is a block diagram of a communication device according to some embodiments of the application. The communication device 1600 shown in FIG. 16 includes a processor 1610, and the processor 1610 can call and run a computer program from the memory to implement the method in some embodiments of the application.

Optionally, as shown in FIG. 16, the communication device 1600 may further include a memory 1620. The processor 1610 may call and run a computer program from the memory 1620 to implement the method according to some embodiments of the application.

The memory 1620 may be a separate device independent of the processor 1610, or may be integrated in the processor 1610.

Optionally, the communication device 1600 may further include an input interface 1630. The processor 1610 can control the input interface 1630 to communicate with other devices or chips, and specifically, can obtain information or data sent by other devices or chips.

Optionally, the communication device 1600 may further include an output interface 1640. The processor 1610 can control the output interface 1640 to communicate with other devices or chips, and specifically, can output information or data to other devices or chips.

Optionally, the communication device 1600 can be applied to the network device according to some embodiments of the application, and the communication device can implement the corresponding processes implemented by the network device in the various methods of the embodiments of the application. For brevity, details are not repeated here.

Optionally, the communication device 1600 may be applied to the terminal device in some embodiments of the application, and the communication device may implement the corresponding process implemented by the terminal device in each method of some embodiments of the application. For brevity, details are not repeated here.

Optionally, the communication device 1600 may be a chip.

The chip may also be called a system-level chip, a system-on-chip, a system-on-a-chip, or a system-on-chip.

The processor in the embodiments of the disclosure may be an integrated circuit chip with signal processing capability. In the implementation process, the steps of the foregoing method embodiments can be completed by hardware integrated logic circuits in the processor or instructions in the form of software. The processor mentioned in some embodiments of the application may be a general-purpose processor, a digital signal processor (DSP), an application specific integrated circuit (ASIC), a field programmable gate array (FPGA), or other programming logic devices, discrete gate or transistor logic devices, discrete hardware components, which can achieve or implement the methods, steps and block diagrams disclosed in embodiments of the disclosure. The general-purpose processor may be a microprocessor or the processor may be any conventional processor or the like. The steps of the method disclosed in the embodiments of the disclosure may be directly embodied as being executed and completed by a hardware decoding processor, or executed and completed by a combination of hardware and software modules in the decoding processor. The software module can be located in a mature storage medium in the art, such as random access memory, flash memory, read-only memory, programmable read-only memory, or electrically erasable programmable memory, registers. The storage medium is located in the memory, and the processor reads the information in the memory and completes the steps of the above method in combination with its hardware.

The memory mentioned in some embodiments of the application may be a volatile memory or a non-volatile memory, or may include both volatile and non-volatile memory. In some embodiments, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache. By way of exemplary but not restrictive illustration, many forms of RAM are available, for example, static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM), and direct Rambus random access memory (direct Rambus RAM, DR RAM) and the like.

The foregoing memories are exemplary but not restrictive. For example, the memory in the embodiments of the disclosure may also be static random access memory (static RAM, SRAM), dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), and the like. In other words, the memory in the embodiments of the disclosure is intended to include, but is not limited to, these and any other suitable types of memory.

Figure 17:
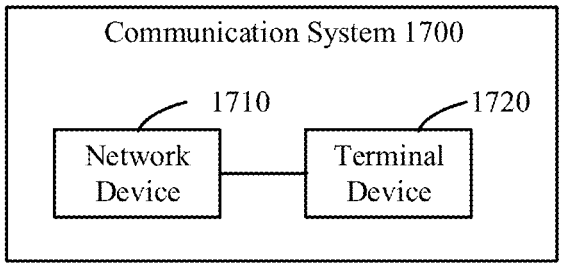
FIG. 17 is a schematic block diagram of the communication system according to some embodiments of the application.

FIG. 17 is a block diagram illustrating a communication system 1700 according to an embodiment of the application. As shown in FIG. 17, the communication system 1700 includes a network device 1710 and a terminal device 1720.

Herein, the network device 1710 is configured to send second indication information to the terminal device, and the second indication information is used for indicating a feedback mode of HARQ information.

The terminal device 1720 is configured to receive the second indication information sent by the network device, and determine the HARQ information feedback mode according to the second indication information.

In some embodiments, the feedback mode of the HARQ information includes a first feedback mode and a second feedback mode. In the first feedback mode, the HARQ information corresponding to the channel group with the same group number transmitted by the terminal device each time has the same codebook size. In the second feedback mode, the HARQ information corresponding to the channel group with the same group number transmitted by the terminal device each time has the variable codebook size, for example, the codebook size is variable based on the flipping indication information received by the terminal device.

The network device 1710 can be configured to implement the corresponding functions implemented by the network device in the method according to the embodiments of the application, and the composition of the network device 1710 can be as shown in the network device 1400 in FIG. 14. For the sake of brevity, it will not be repeated here.

The terminal device 1720 can be configured to implement the corresponding functions implemented by the terminal device in the method according to the embodiments of the application, and the composition of the terminal device 1720 can be as shown in the terminal device 1300 in FIG. 13. For the sake of brevity, it will not be repeated here.

Embodiments of the application also provide a computer-readable storage medium for storing a computer program. Optionally, the computer-readable storage medium can be applied to the network device according to the embodiments of the application, and the computer program causes a computer to execute the corresponding process implemented by the network device in each method according to the embodiments of the application. For the sake of brevity, it will not be repeated here. Optionally, the computer-readable storage medium can be applied to the terminal device according to the embodiments of the application, and the computer program causes the computer to execute the corresponding process implemented by the terminal device in each method according to the embodiments of the application. For the sake of brevity, it will not be repeated here.

The embodiments of the application also provide a computer program product, including computer program instructions. Optionally, the computer program product can be applied to the network device according to the embodiments of the application, and the computer program instructions cause a computer to execute the corresponding process implemented by the network device in each method according to the embodiments of the application. For the sake of brevity, it will not be repeated here. Optionally, the computer program product can be applied to the terminal device according to the embodiments of the application, and the computer program instructions cause the computer to execute the corresponding process implemented by the terminal device in each method according to the embodiments of the application. For the sake of brevity, it will not be repeated here.

The embodiments of the application also provide a computer program. Optionally, the computer program can be applied to the network device according to the embodiments of the application, and the computer program, when running on a computer, causes the computer to execute the corresponding process implemented by the network device in each method according to the embodiments of the application. For the sake of brevity, it will not be repeated here. Optionally, the computer program can be applied to the terminal device according to the embodiments of the application, and the computer program, when running on a computer, causes the computer to execute the corresponding process implemented by the terminal device in each method according to the embodiments of the application. For the sake of brevity, it will not be repeated here.

The terms "system" and "network" in the embodiments of the application are often used interchangeably herein. The term "and/or" in this disclosure refers to only an association relationship describing associated objects, which means that there can be three relationships, for example, A and/or B means three situations: A exists alone, A and B exist at the same time, B exists alone. In addition, the character "/" in this disclosure generally indicates that the associated objects before and after are in an "or" relationship.

In the embodiments of the application, "B corresponding to A" means that B is associated with A, and B can be determined according to A. However, it should also be understood that determining B according to A does not mean determining B only according to A, and B can also be determined according to A and/or other information.

A person of ordinary skill in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of this application.

Those skilled in the art can clearly understand that, for the convenience and conciseness of description, the specific working process of the system, device and unit described above can refer to the corresponding process in the foregoing method embodiment, which will not be repeated here.

In the several embodiments provided in this application, it should be understood that the disclosed system, device, and method may be implemented in other ways. For example, the device embodiments described above are only illustrative. For example, the division of the unit is only a logical function division. In actual implementation, there may be other division methods. For example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or they may be distributed on multiple network units. Some or all of the units may be selected according to actual needs to achieve the objectives of the solutions of the embodiments.

In addition, the functional units in each embodiment of the application may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the essential part of the technical solution of this application or the part of the technical solution that contributes to the related art can be embodied in the form of a software product, and the computer software product is stored in a storage medium, including several instructions used for causing a computer device (which may be a personal computer, a server, or a network device, etc.) to execute all or part of the steps of the method described in each embodiment of the application. The aforementioned storage medium includes U disk, mobile hard disk, read-only memory (ROM), random access memory (RAM), magnetic disk or optical disk and other medium that can store program codes.

The above are only specific implementations of this application, but the protection scope of this application is not limited thereto. Any person skilled in the art can easily think of changes or substitutions within the technical scope disclosed in this application, which should fall within the protection scope of this application. Therefore, the protection scope of this application shall be subject to the protection scope of the claims.

What is claimed is:

1. A method for feeding back hybrid automatic repeat request HARQ information, comprising:
   determining, by a terminal device, HARQ information corresponding to a first channel group; and
   resetting, by the terminal device, the HARQ information corresponding to the first channel group when receiving a second channel meeting a preset condition, and/or when receiving first indication information used for indicating resetting of HARQ information;
   wherein the preset condition comprises a group number of a channel group to which the second channel belongs is the same as a group number of the first channel group; and
   wherein the second channel is located after a first uplink resource in time domain, and the first uplink resource is used for sending the HARQ information corresponding to the first channel group.

2. The method according to claim 1, wherein before the terminal device receives the second channel, and/or before the terminal device receives the first indication information, the terminal device has sent HARQ information corresponding to the first channel group for at least once.

3. The method according to claim 2, wherein the terminal device has sent the HARQ information corresponding to the first channel group for multiple times, and codebook sizes of the HARQ information corresponding to the first channel group sent for multiple times are the same or different.

4. The method according to claim 2, wherein a time interval between the terminal device sending the HARQ information corresponding to the first channel group and the terminal device receiving the second channel is greater than or equal to a first preset value, and/or a time interval between the terminal device sending the HARQ information corresponding to the first channel group and the terminal device receiving the first indication information is greater than or equal to the first preset value.

5. The method according to claim 4, wherein the first preset value is determined by a network device according to a processing time of the network device.

6. The method according to claim 4, wherein the first preset value is configured by a network device for the terminal device, or defined in a protocol.

7. The method according to claim 1,
   wherein said resetting, by the terminal device, the HARQ information corresponding to the first channel group when receiving the second channel meeting the preset condition comprises:
   resetting, by the terminal device, the HARQ information corresponding to the first channel group when receiving the second channel and a value of second downlink assignment index DAI information corresponding to the second channel is less than or equal to a value of first DAI information corresponding to the first channel, wherein the value of the first DAI information is used for indicating a location of the first channel in the first channel group, and the value of the second DAI information is used for indicating a location of the second channel in the channel group to which the second channel belongs.

8. The method according to claim 1, wherein the terminal device receiving the second channel meeting the preset condition comprises: receiving, by the terminal device, a downlink channel meeting the preset condition and used for scheduling the second channel, or receiving, by the terminal device, data carried in the second channel meeting the preset condition.

9. A terminal device, comprising:
 a processor, configured to determine hybrid automatic repeat request HARQ information corresponding to a first channel group; and
 a storage, configured to buffer the HARQ information corresponding to the first channel group,
 wherein the processor is configured to control the storage to reset the HARQ information corresponding to the first channel group when the terminal device receives a second channel meeting a preset condition, and/or when the terminal device receives first indication information used for indicating resetting of HARQ information;
 wherein the preset condition comprises a group number of a channel group to which the second channel belongs is the same as a group number of the first channel group; and
 wherein the second channel is located after a first uplink resource in time domain, and the first uplink resource is used for sending the HARQ information corresponding to the first channel group.

10. The terminal device according to claim 9, wherein before the terminal device receives the second channel, and/or before the terminal device receives the first indication information, the terminal device has sent HARQ information corresponding to the first channel group for at least once.

11. The terminal device according to claim 10, wherein the terminal device has sent the HARQ information corresponding to the first channel group for multiple times, and codebook sizes of the HARQ information corresponding to the first channel group sent for multiple times are the same or different.

12. The terminal device according to claim 10, wherein a time interval between the terminal device sending the HARQ information corresponding to the first channel group and the terminal device receiving the second channel is greater than or equal to a first preset value, and/or a time interval between the terminal device sending the HARQ information corresponding to the first channel group and the terminal device receiving the first indication information is greater than or equal to the first preset value.

13. The terminal device according to claim 12, wherein the first preset value is determined by a network device according to a processing time of the network device.

14. The terminal device according to claim 9, wherein the first uplink resource is used by the terminal device when sending the HARQ information corresponding to the first channel group for the first time, and/or the first uplink resource is determined by the terminal device according to HARQ timing indicator information corresponding to a channel in the first channel group.

15. The terminal device according to claim 9, wherein a second uplink resource is located after the first uplink resource, the second uplink resource is used for sending HARQ information corresponding to the channel group to which the second channel belongs, and the second uplink resource is determined by the terminal device according to HARQ timing indicator information corresponding to the second channel.

16. The terminal device according to claim 9, wherein a number of data channels in each channel group is less than or equal to a second preset value.

17. The terminal device according to claim 16, wherein the second preset value is configured by a network device for the terminal device, or is defined in a protocol.

18. A non-transitory computer-readable storage medium, storing a computer program, wherein the computer program causes a computer to perform:
 determining HARQ information corresponding to a first channel group; and
 resetting the HARQ information corresponding to the first channel group when receiving a second channel meeting a preset condition, and/or when receiving first indication information used for indicating resetting of HARQ information;
 wherein the preset condition comprises a group number of a channel group to which the second channel belongs is the same as a group number of the first channel group; and
 wherein the second channel is located after a first uplink resource in time domain, and the first uplink resource is used for sending the HARQ information corresponding to the first channel group.

\* \* \* \* \*